United States Patent
Haghighat et al.

(10) Patent No.: US 12,207,278 B2
(45) Date of Patent: *Jan. 21, 2025

(54) METHODS, APPARATUSES AND SYSTEMS DIRECTED TO PHASE-CONTINUOUS FREQUENCY SELECTIVE PRECODING

(71) Applicant: InterDigital Patent Holdings, Inc., Wilmington, DE (US)

(72) Inventors: Afshin Haghighat, Ile-Bizard (CA); Oghenekome Oteri, San Diego, CA (US); Alphan Sahin, Westbury, NY (US); Shahrokh Nayeb Nazar, San Diego, CA (US); Moon-il Lee, Melville, NY (US); Prasanna Herath Mudiyanselage, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/383,579

(22) Filed: Oct. 25, 2023

(65) Prior Publication Data

US 2024/0073914 A1 Feb. 29, 2024

Related U.S. Application Data

(63) Continuation of application No. 17/114,477, filed on Dec. 7, 2020, now Pat. No. 11,844,086, which is a
(Continued)

(51) Int. Cl.
*H04W 72/23* (2023.01)
*H04B 7/0456* (2017.01)
(Continued)

(52) U.S. Cl.
CPC .......... *H04W 72/23* (2023.01); *H04B 7/0456* (2013.01); *H04B 7/0628* (2013.01)

(58) Field of Classification Search
CPC ... H04W 72/23; H04B 7/0456; H04B 7/0628; H04B 7/0671; H04L 25/0204; H04L 5/0048
See application file for complete search history.

(56) References Cited

U.S. PATENT DOCUMENTS 8,654,663 B2  2/2014  Prasad et al.
8,917,677 B2  12/2014  Liu et al.
(Continued)

FOREIGN PATENT DOCUMENTS

CN   103974427 A   8/2014
CN   103997722 A   8/2014
(Continued)

OTHER PUBLICATIONS

Discussion on phase continuity and PRB bundling, 3GPP Tdoc R1-1612045, 3GPP TSG-RAN WG1 #87, Reno, Nevada, Nov. 14-18, 2016, 10 pages.
(Continued)

*Primary Examiner* — Harry H Kim
(74) *Attorney, Agent, or Firm* — Majid Albassam

(57) ABSTRACT

Methods, apparatuses, systems, devices, and computer program products directed to phase-continuous frequency selective precoding are provided. Included among these classes are methods for use in connection with dynamic precoding resource block group (PRG) configuration and with codebook based transmission configuration. A representative of such methods may include any of receiving signaling indicating transmit precoding information; determining a candidate PRG size using any of the transmit precoding information, a rule for determining a PRG size and configured PRG sizes; and configuring or reconfiguring a wireless transmit/receive device in accordance with the candidate PRG size. Another of the representative methods may include reporting a transmission coherence capability
(Continued)

of a wireless transmit/receive unit; receiving a codebook subset restriction (CBSR) commensurate with the transmission coherence capability; determining a transmit precoding matrix indices (TPMI) size based on the CBSR; receiving a TPMI; and detecting or decoding the TPMI based on the determined TPMI size.

20 Claims, 19 Drawing Sheets

Related U.S. Application Data continuation of application No. 16/477,087, filed as application No. PCT/US2018/013685 on Jan. 13, 2018, now Pat. No. 10,863,497.

(60) Provisional application No. 62/587,247, filed on Nov. 16, 2017, provisional application No. 62/586,843, filed on Nov. 15, 2017, provisional application No. 62/569,310, filed on Oct. 6, 2017, provisional application No. 62/543,176, filed on Aug. 9, 2017, provisional application No. 62/519,774, filed on Jun. 14, 2017, provisional application No. 62/501,062, filed on May 3, 2017, provisional application No. 62/446,347, filed on Jan. 13, 2017.

(51) Int. Cl.
*H04B 7/06* (2006.01)
*H04L 5/00* (2006.01)
*H04L 25/02* (2006.01)

(56) References Cited

U.S. PATENT DOCUMENTS

| | | | |
|---|---|---|---|
| 10,153,881 B2 | 12/2018 | Kim et al. | |
| 2011/0255505 A1 | 10/2011 | Liu et al. | |
| 2012/0045019 A1 | 2/2012 | Li et al. | |
| 2013/0039284 A1 | 2/2013 | Marinier et al. | |
| 2013/0170449 A1 | 7/2013 | Chen et al. | |
| 2013/0244656 A1 | 9/2013 | Heo et al. | |
| 2014/0112225 A1 | 4/2014 | Jafarian et al. | |
| 2014/0314007 A1 | 10/2014 | Chen et al. | |
| 2015/0043450 A1 | 2/2015 | Ariyavisitakul et al. | |
| 2015/0043522 A1 | 2/2015 | Mobasher et al. | |
| 2015/0078474 A1 | 3/2015 | Mazzarese et al. | |
| 2015/0146681 A1* | 5/2015 | Liu | H04L 5/0035 370/330 |
| 2016/0065340 A1 | 3/2016 | Li et al. | |
| 2016/0227520 A1 | 8/2016 | Davydov et al. | |
| 2016/0344487 A1 | 11/2016 | Lee et al. | |
| 2017/0366316 A1* | 12/2017 | Kim | H04L 5/0073 |
| 2018/0042028 A1* | 2/2018 | Nam | H04L 5/0035 |
| 2018/0324603 A1 | 11/2018 | Hessler et al. | |
| 2019/0007181 A1* | 1/2019 | Marinier | H04L 5/0051 |
| 2019/0199420 A1* | 6/2019 | Faxér | H04L 5/0057 |
| 2019/0261329 A1* | 8/2019 | Park | H04L 5/0048 |
| 2020/0136679 A1 | 4/2020 | Shen et al. | |
| 2020/0196281 A1* | 6/2020 | Bergman | H04W 4/70 |
| 2020/0351050 A1* | 11/2020 | Kwak | H04W 72/12 |
| 2024/0172207 A1* | 5/2024 | Lin | H04L 5/0053 |

FOREIGN PATENT DOCUMENTS

| | | |
|---|---|---|
| CN | 104115539 A | 10/2014 |
| CN | 104170295 A | 11/2014 |
| EP | 2378698 A2 | 10/2011 |

OTHER PUBLICATIONS

"Consideration on Downlink DM-RS PRB-bundling", 3GPP Tdoc R1-102376, 3GPP TSG RAN WG1 Meeting #60bis, Beijing, China, Apr. 12-16, 2010, 5 pages.
Samsung, "Discussion on RB Bundling for DM-RS", 3GPP Tdoc R1-102187, 3GPP TSG RAN WG1 Meeting #60bis Beijing, China, Apr. 12-16, 2010, 5 pages.
"Investigations on Codebook Size for MIMO Precoding in E-UTRA Downlink", 3GPP Tdoc R1-070093, 3GPP TSG RAN WG1 Meeting #47bis, Sorrento, Italy, Jan. 15-19, 2007, 10 pages.
International Search Report and Written Opinion, International Application No. PCT/US2018/013685, Jun. 26, 2018, 23 pages.

* cited by examiner

METHODS, APPARATUSES AND SYSTEMS DIRECTED TO PHASE-CONTINUOUS FREQUENCY SELECTIVE PRECODING

CROSS REFERENCE TO RELATED APPLICATIONS

This application is a continuation of U.S. patent application Ser. No. 17/114,477, filed 2020 Dec. 7, which is a continuation of U.S. patent application Ser. No. 16/477,087, filed 2019 Jul. 10, which is a 371 of International Application PCT/US2018/013685 filed 2018 Jan. 13, which issued as U.S. Pat. No. 10,863,497, on 2020 Dec. 8, and claims the benefit of U.S. Provisional Patent Application Nos. (i) 62/446,347 filed 2017 Jan. 13, (ii) 62/501,062 filed 2017 May 3, (iii) 62/519,774 filed 2017 Jun. 14, (iv) 62/543,176 filed 2017 Aug. 9, (v) 62/569,310 filed 2017 Oct. 6, (vi) 62/586,843 filed 2017 Nov. 15, and (vii) 62/587,247 filed 2017 Nov. 16; each of which is incorporated herein by reference in its entirety.

BACKGROUND

Field

This application is related to wireless communications.

Related Art

In Long Term Evolution (LTE), a precoding resource block group (PRG) may be utilized to configure precoding granularity in a frequency domain and to facilitate channel estimation at a wireless transmit/receive unit (WTRU), whereby the WTRU carries out channel estimation across a group of consecutive physical resource blocks (PRBs). In LTE, the PRG is a function of the system bandwidth with possible values of 1, 2, 3, 2 for system bandwidths of 1.4 MHz, 3-5 MHz, 10 MHz, >10 MHz, respectively. A WTRU may assume that the channel over which a symbol on a demodulation reference signal antenna port is conveyed in a first PRB within a PRG can be inferred from the channel over which another symbol on the same demodulation reference signal antenna port is conveyed in a second PRB within the same PRG. In another example, a WTRU may assume that a same precoder is use for a demodulation reference signal antenna port in a first PRB within a PRG and the same demodulation reference signal antenna port in a second PRB within the same PRG. Hereafter, PRB, RB, and virtual RB (VRB) may be interchangeably used.

In LTE, resource block group (RBGs) may be utilized to divide available resource blocks into multiple groups for allocation purposes. The number of resource block in a RBG is also function of the system bandwidth with possible values of 1, 2, 3, 4 for the system bandwidths of 1.4 MHz, 3-5 MHz, 10 MHz, >10 MHz, respectively.

In NR, frequency selective precoding may be improved over LTE, for example, by having more flexibility in choosing precoding resolution. In LTE, the values from which to select the PRB and the PRG ("PRB and PRG sizes") are very restricted, and precoding operation is applied on the specific PRB and PRG sizes. While such approach has some benefits in terms of feedback overhead, it may not be sufficient in harnessing the frequency selectivity of the channel.

An alternative approach may be to carry out frequency selective precoding at a resolution finer than the precoding resolution of LTE to enhance MIMO performance. Assuming LTE-like WTRU-specific and/or demodulation reference signals (collectively "DMRSs") along with precoding procedures and codebooks, adopting a higher resolution for frequency selective precoding may lead to significant challenges for channel estimation. Due to potential abrupt transitions between selected adjacent precoders, there will be discontinuities on the effective channel. Therefore, a wideband channel estimation might not be possible leading to either some distortion or poor channel estimation.

In phase-continuous precoding, adjacent precoders may be designed to be continuous in phase to allow for channel estimation smoothing regardless of whether reference symbols are precoded (or not). Some of the proposed methods to perform phase-continuous precoding include time-domain pruning and filtering based on DFT/IDFT processing to ensure phase continuity (see, e.g., Qualcomm Incorporated, "Discussion on phase continuity and PRB bundling", 3GPP Tdoc R1-1612045, 3GPP TSG-RAN WG1 Meeting #87, Reno, USA, Nov. 14-18, 2016; hereinafter "[1]"); and (ii) frequency smoothed beamforming using a smoothed singular value decomposition (SVD), involving finite impulse response (FIR) filtering of nearest adjacent subcarriers, or orthogonal iteration based method to generate eigenvectors.

However, with precoded DMRS, the reference signal in adjacent resources may be modified by different precoders. This prevents averaging of channel estimates across the resources and reduces the accuracy of the channel estimate. Accordingly, precoding and precoder mechanisms are needed to allow smooth transition between adjacent precoders.

In addition to design of continuous-phase precoding, information exchange may be needed to allow both a WTRU and a base station (e.g., a gNB) to be aware of respective transmitters and receivers capabilities, and/or to inform one another of the use of phase-continuous precoding so as to enable the respective receiver to implement channel estimation smoothing.

High resolution frequency selective precoding may be applicable to DL and UL MIMO operation. Hence, procedures and support mechanisms are needed to enable implementation of such high resolution frequency selective precoding.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein:

FIG. 6 is a flow chart illustrating a representative procedure for performing phase-continuous precoding with non-zero edge smoothing;

FIGS. 20-21 are flow charts illustrating representative procedures for use in connection with phase-continuous precoding;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
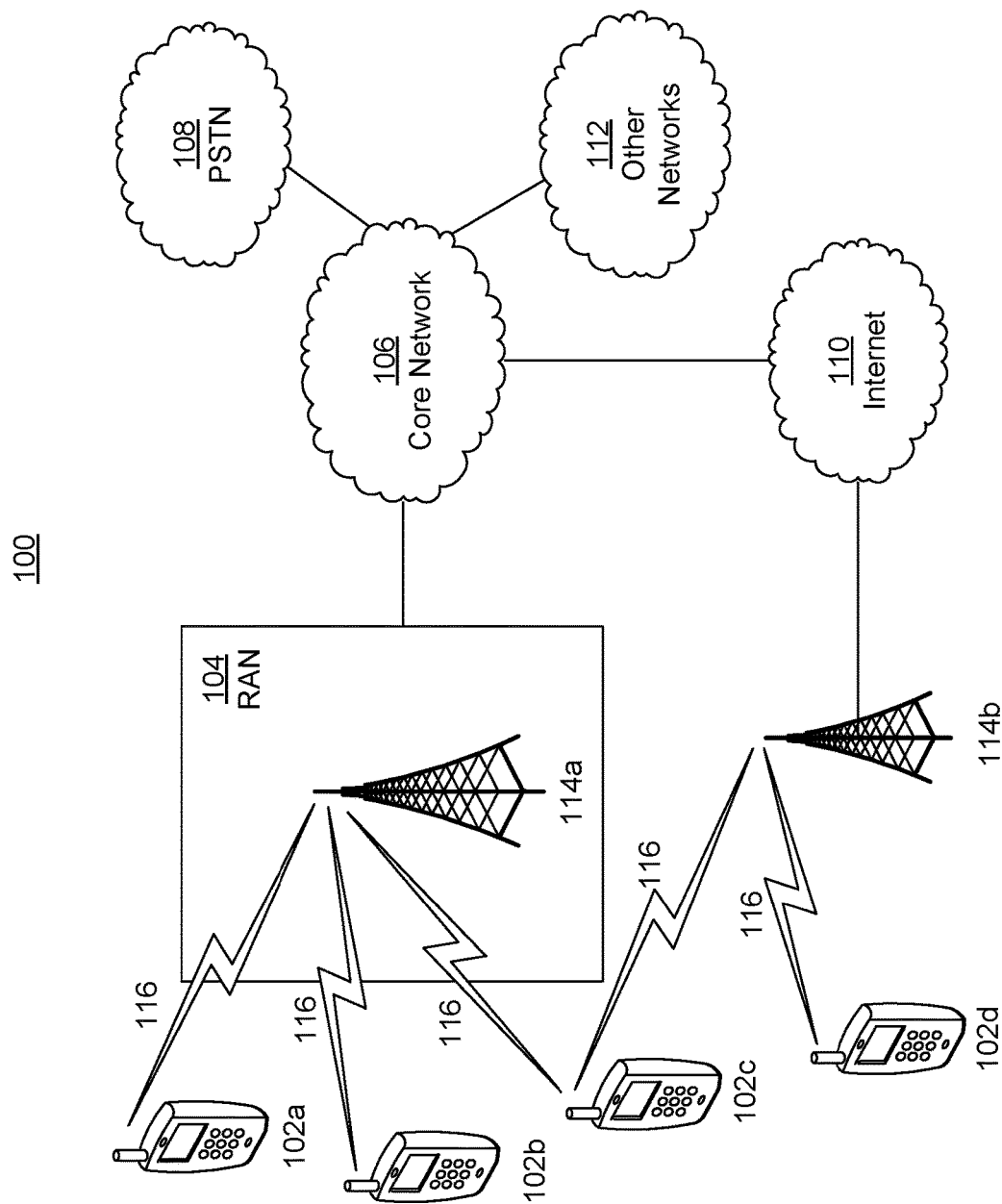
FIG. 1A is a system diagram of an example communications system in which one or more disclosed embodiments may be implemented.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
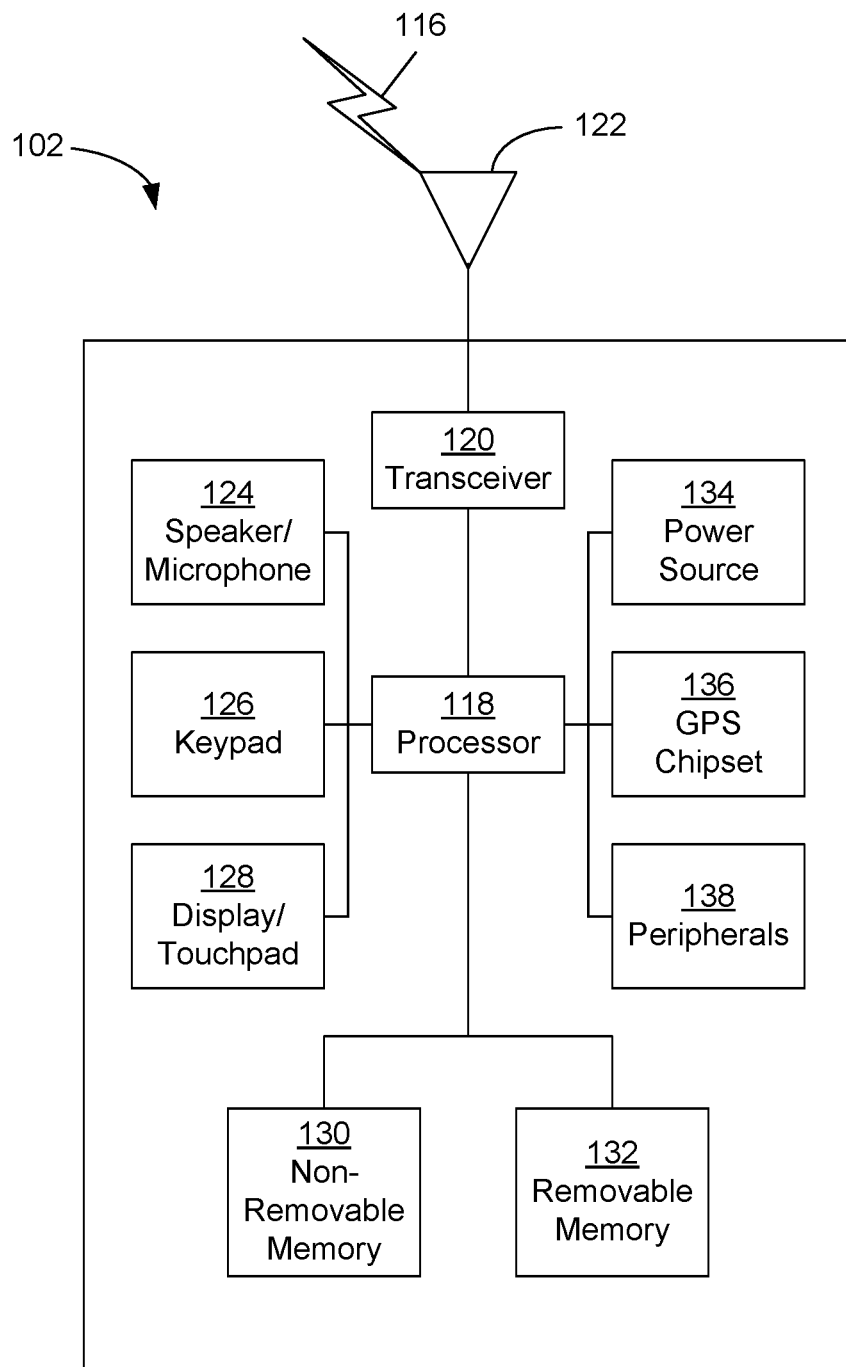
FIG. 1B is a system diagram of an example wireless transmit/receive unit (WTRU) that may be used within the communications system illustrated in FIG. 1A according to an embodiment.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
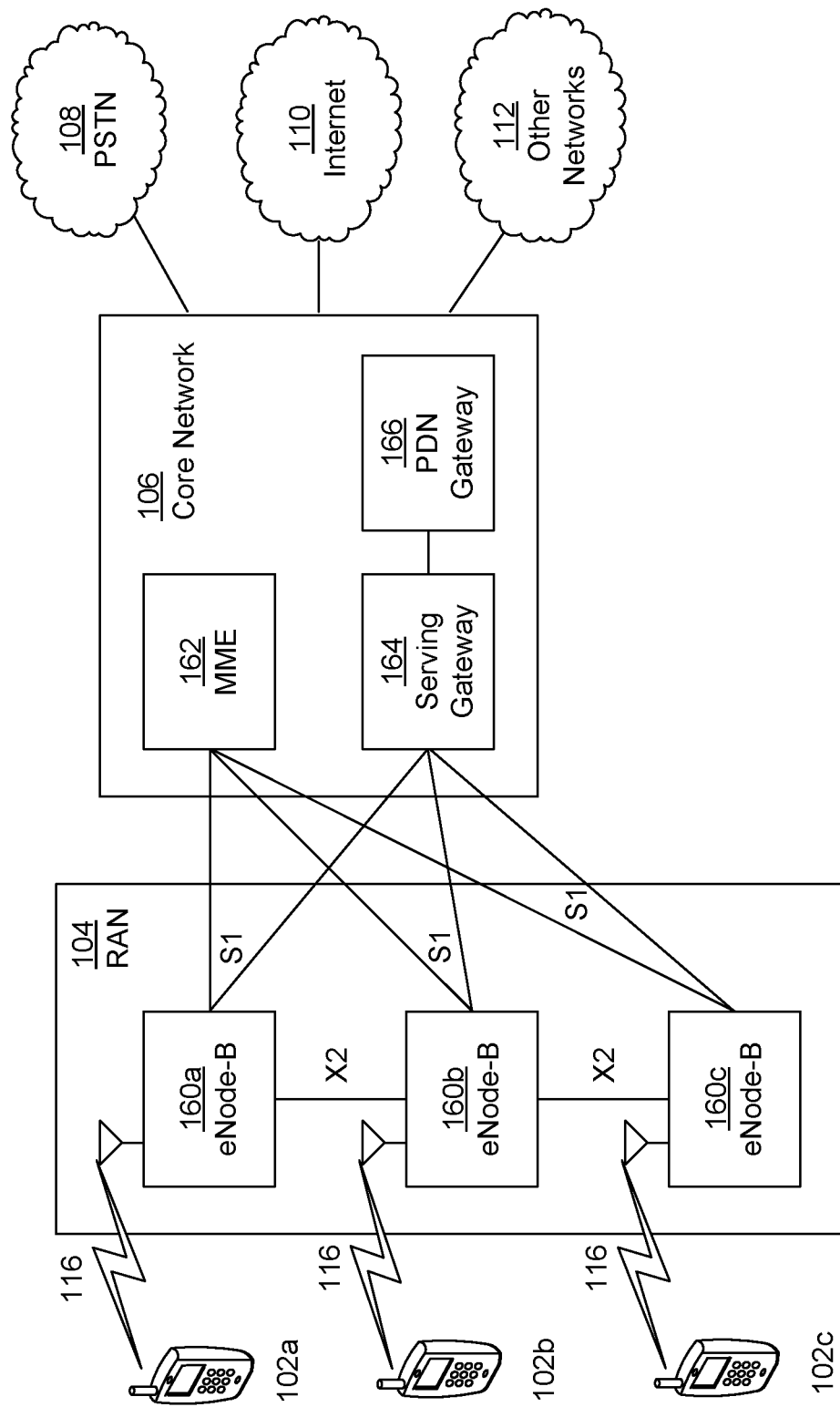
FIG. 1C is a system diagram illustrating an example radio access network (RAN) and an example core network (CN) that may be used within the communications system illustrated in FIG. 1A according to an embodiment.

FIG. 1C is a system diagram of the RAN 104 and the CN 106 according to another embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The SGW 164 may be connected to each of the eNode-Bs 160a, 160b, 160c in the RAN 104 via the Si interface. The SGW 164 may generally route and forward user data packets to/from the WTRUs 102a, 102b, 102c. The SGW 164 may also perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (B SS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
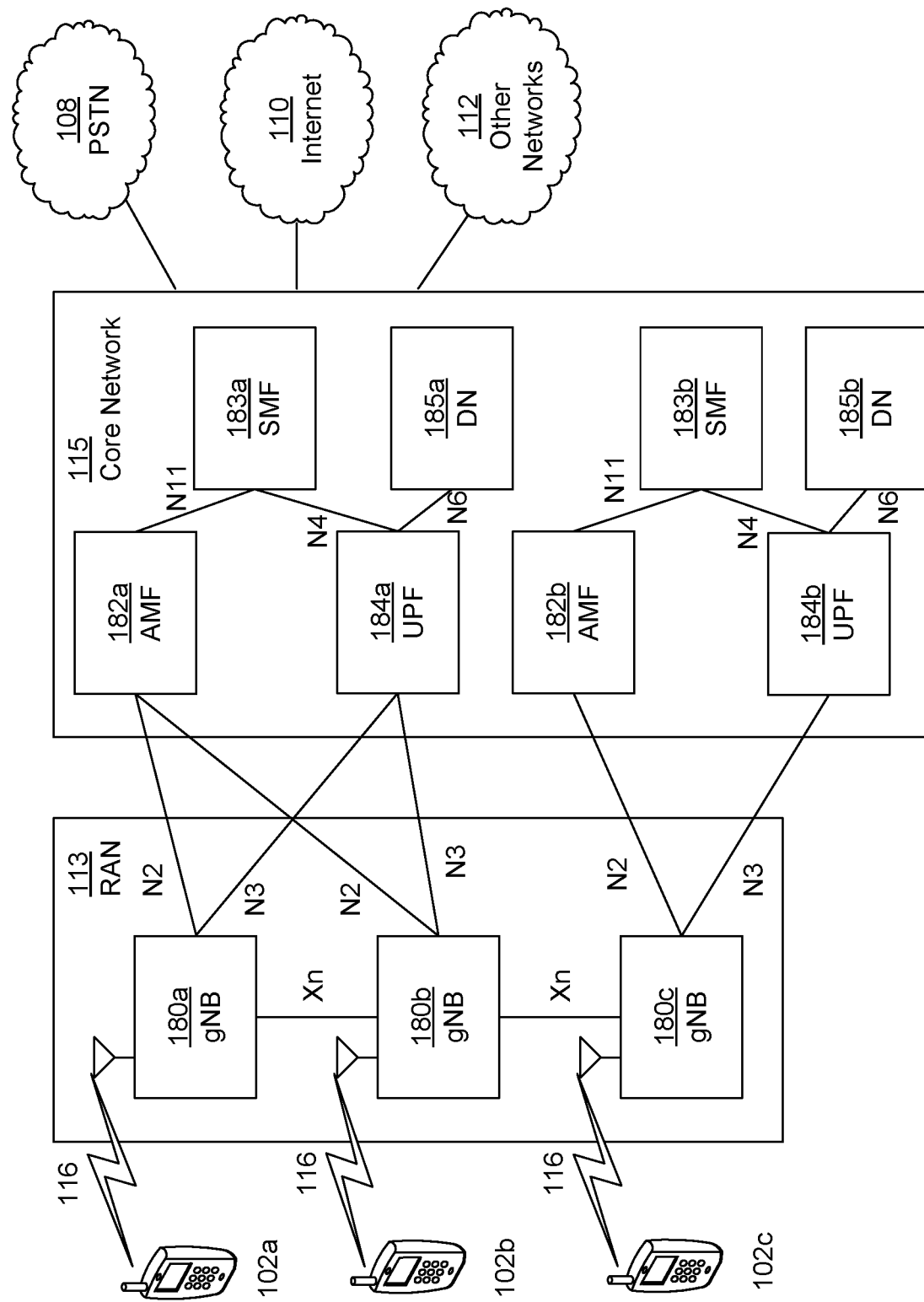
FIG. 1D is a system diagram illustrating an example RAN and an example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different packet data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
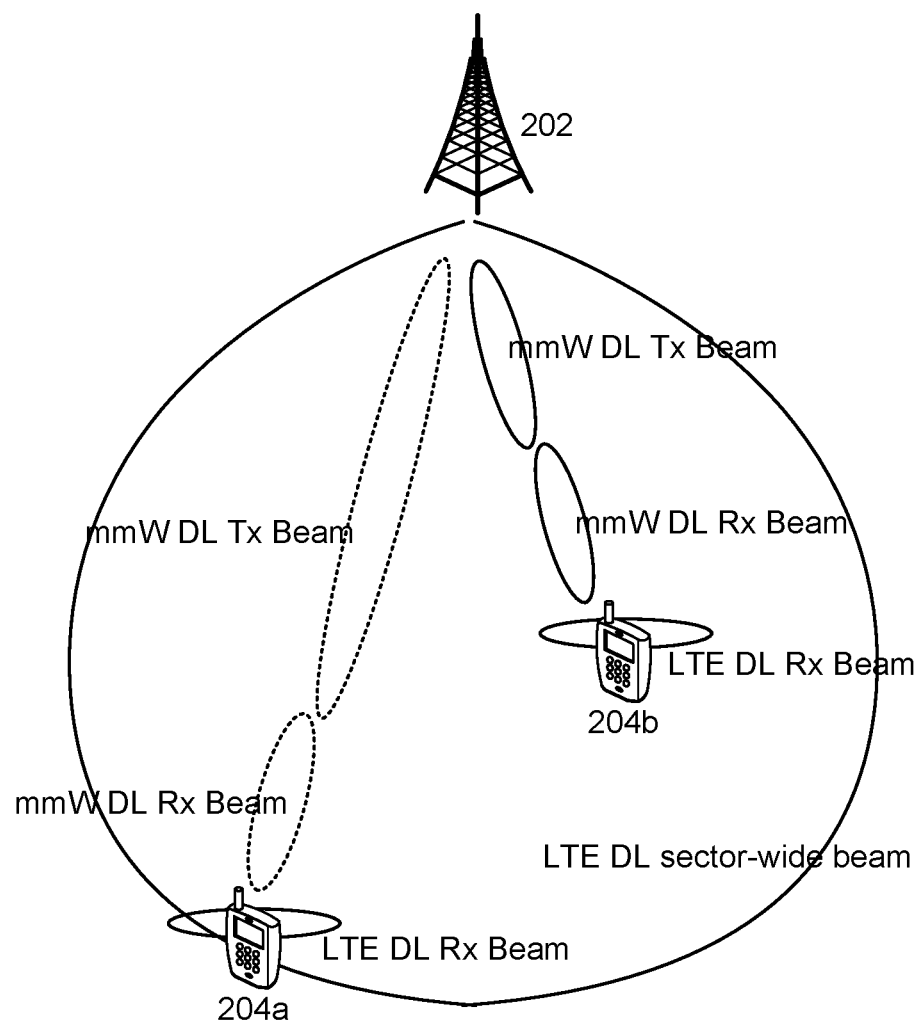
FIG. 2 illustrates an example communications system in which embodiments may be practiced or implemented.

FIG. 2 illustrates an example communications system 200 in which embodiments may be practiced or implemented. The communications system 200 is provided for the purpose of illustration only and is not limiting of disclosed embodiments. As shown in FIG. 2, the communications system 200 includes a base station 202 and WTRUs 204a, 204b. As would be understood by a person of skill in the art, the communications system 200 may include additional elements not shown in FIG. 2.

The base station 202 may be any of the base stations 114 (FIG. 1A), eNode-Bs 160 (FIG. 1C) and gNBs 180 (FIG. 1D), for example. The base station 202 may include functionality similar to, and/or different from, the base stations 114, eNode-Bs 160 and gNBs 180, as well. For example, the base station 202 may include functionality to support features of 5G and to implement the procedures, techniques, etc. included herein.

The base station 202 may be configured for small cell operation and/or deployment. The base station 202 may be configured to support any of centimeter wave (cmW) and millimeter wave (mmW) operation. For simplicity of exposition, the term "xmW" may be used herein to refer to any of cmW and mmW. The base station 202 may be additionally and/or alternatively configured to support various (e.g., all or some) functionality and/or features for small cell operation and/or deployment as specified in 3GPP Release 12. In this regard, the base station 202 may be capable of operating an xmW air interface in parallel, simultaneously and/or otherwise in connection with an LTE, LTE-A or like-type (collectively "LTE") air interface. The base station 202 may be equipped with at least one of various advanced antenna configurations and beamforming techniques, such as those that may allow the base station 202 to simultaneously transmit LTE downlink channels in a wide beam pattern and xmW channels in one or more narrow beam patterns. The base station 202 may also be configured to utilize an LTE uplink configuration adapted with features and procedures (e.g., those detailed herein) to support WTRUs that lack, or do not use their, xmW uplink transmission capabilities.

Each of the WTRUs 204a, 204b may be any of the WTRUs 102 (FIGS. 1A-1D), for example. Each of the WTRUs 204a, 204b may include functionality similar to, and/or different from, the WTRUs 102, as well. The WTRUs 204a, 204b may include functionality to support features of 5G and to implement the procedures, techniques, etc. included herein. For simplicity of exposition, when "WTRU 204" is used herein, it may refer to any of the WTRUs 204a, 204b.

Each of the WTRUs 204a, 204b may be configured to support xmW operation. The WTRUs 204a, 204b may be further configured to support various (e.g., all or some) functionality and/or features for user equipment operation and/or deployment as specified in 3GPP Release 12. Each of the WTRUs 204a, 204b may be capable of operating LTE and xmW air interfaces in parallel, simultaneously and/or otherwise in connection with each other. Each of the WTRUs 204a, 204b may have two sets of antennas and accompanying RF chains; one configured for operating in a LTE band and the other configured for operating in a xmW frequency band. However, the present disclosure is not limited thereto, and a WTRU may have any number of sets of antennas and accompanying RF chains. Each of the WTRUs 204a, 204b may include one or more baseband processors, and the baseband processors may include separate, or at least partially combined, functionality for baseband processing of the LTE frequency band and the xmW frequency band. The baseband processing functions may share hardware blocks for the xmW and LTE air interfaces, for example.

As used herein the term(s) "effective channel" may refer to a product of precoding and the actual wireless channel. Also, as used herein below the term(s) "per-tone precoding" may imply a phase-continuous precoding operation and vice-versa.

Overview

This disclosure is drawn, inter alfa, to methods, apparatuses, systems, devices, and computer program products directed to phase-continuous frequency selective multiple-input multiple-output (MIMO) precoding. The methods may include any of (i) performing phase-continuous precoding using cyclic delay diversity (CDD), (ii) performing phase-continuous precoding with non-zero edge smoothing, (iii) performing phase-continuous precoding with phase transition region, and (iv) performing phase-continuous precoding for non-contiguous transmission.

In an embodiment, performing phase-continuous precoding using CDD may include any of determining, for a plurality of precoding resource sets (PRSs), a respective plurality of CDD-based precoding matrices; precoding a first PRS of the plurality of PRSs using (at least) the respective first CDD-based precoding matrix of the plurality of CDD-based precoding matrices and a first matrix adapted to provide an initial phase for precoding; and precoding a second PRS of the plurality of PRSs using (at least) the respective second CDD-based precoding matrix of the plurality of CDD-based precoding matrices and a second matrix adapted to provide phase continuity from the first precoded PRS.

Among the methods is first a method that may be implemented in a first device configured to communicate with a second device, and that may include informing a first device of capabilities of a second device; and determining whether the second device supports phase-continuous precoding based on capabilities of the second device. The first and second devices may be a base station and a wireless transmit/receiver unit (WTRU) (or vice versa), respectively.

Among the methods is a second method that may be implemented in a first device configured to communicate with a second device, and that may include informing, by the first device, that a specific transmission is using phase-continuous precoders in the control channel. The first and second devices may be a base station and a WTRU (or vice versa), respectively.

Among the methods is a third method that that may include, for multi-user transmission, each WTRU of a plurality of WTRUs signaling a base station whether it is using phase-continuous precoding.

Among the methods is a fourth method that that may include transmitting a single bit to indicate per-tone precoding vs wideband precoding on a control channel. Among the methods is a fifth method that that may include transmitting information to indicate per-tone precoding vs wideband precoding implicitly by embedding the information into a demodulation reference signal (DMRS).

Among the methods is a sixth method that that may include receiving a size of a precoding resource block group (PRG); and determining, based on the size of the PRG, whether per-tone precoding (or wideband precoding) is activated. In an embodiment, the size of the PRG is or corresponds to a size of a scheduling grant.

Among the methods is a seventh method that that may include decoding a control channel at a device; and on discovering that a data channel is phase-continuously precoded, implementing, at the device, channel estimation smoothing.

Among the methods is an eighth method that that may include blindly estimating, at a device, whether a data channel is precoded using phase continuous precoders; and on failure to decode the data channel, decoding the data channel assuming no phase-continuous precoding.

Among the methods is a ninth method that may be implemented in a first device configured to communicate with a second device, and may include transmitting, to the second device, signaling indicating transmit precoding information for (i) a plurality of subbands of a first bandwidth assigned to the second device, and (ii) one or more second bandwidths. The signaling may include a resource allocation defining the first bandwidth. The signaling may be a grant, for example. Alternatively, the signaling may include a combination of a grant and higher layer signaling.

Among the methods is a tenth method that may be implemented in a first device configured to communicate with a second device, and may include transmitting, to the second device, signaling indicating transmit precoding information for (i) a plurality of subbands of a first bandwidth assigned to the second device, and (ii) one or more second bandwidths; and transmitting a grant including a resource allocation defining a third bandwidth including at least one segment of the one or more second bandwidths.

In an any of the methods provided herein, the transmit precoding information may include one or more transmit precoding information indications. the one or more transmit precoding information indications comprises one or more transmit precoding matrix indices (TPMI) indications. Alternatively, the transmit precoding information may include one or more sounding reference signal (SRS) resource indicators (SRIs). The SRIs may include one or more (e.g., respective) transmit precoding information indications. Each SRI may associate one or more SRS ports to one of the transmit precoding information indications. Each SRI may include an indication of one or more SRS ports and one of the transmit precoding information indications. The transmit precoding information indications may correspond to any of a single stage codebook and a dual stage codebook.

The transmit precoding information may include one or more first transmit precoding information indications for the plurality of subbands and one or more second transmit precoding information indications for the one or more second bandwidths. The first transmit precoding information indications may be one or more TPMI indications, and the second transmit precoding information indications may include one or more TPMI indications. Alternatively, the transmit precoding information may include one or more first SRIs and one or more second SRIs. The first SRIs may include one or more first transmit precoding information indications for the plurality of subbands. The second SRIs may include one or more second transmit precoding information indications for the one or more second bandwidths. Each of the first SRIs may associate one or more SRS ports to one of the first transmit precoding information indications. Each of the second SRIs may associate one or more SRS ports to one of the second transmit precoding information indications. Each of the first SRIs may include an indication of one or more SRS ports and one of the first transmit precoding information indications. Each of the second SRIs may include an indication of one or more SRS ports and one of the one or more second transmit precoding information indications.

The first transmit precoding information indications may be updated at a different rate than the second transmit precoding information indications. For example, the first transmit precoding information indications may be updated more frequently than the second transmit precoding information indications.

The first SRIs may be updated at a different rate than the second SRIs. For example, the first SRIs may be updated more frequently than the one or more second SRIs.

The first transmit precoding information indications may correspond to a dual-stage codebook. The second transmit precoding information indications may correspond to a single-stage codebook.

In an embodiment, the first transmit precoding information indications may correspond to one or more (e.g., respective) narrow-band precoder components and the second transmit precoding information indications may correspond to one or more (e.g., respective) mid-band precoder components. In an embodiment, the first transmit precoding information indications may correspond to one or more (e.g., respective) narrow-band precoder components, and the second transmit precoding information indications may correspond to one or more (e.g., respective) wide-band precoder components.

In an embodiment, the plurality of subbands may have a respective plurality of bandwidths, and the first bandwidth may span the plurality of bandwidths. The plurality of subbands may be contiguous or non-contiguous. The plurality of subbands may correspond to a selective set of (e.g., best M) subbands of the first bandwidth.

Among the methods is a tenth method that may be implemented in a first device configured to communicate with a second device, and may include transmitting, to the second device in connection with a first of a plurality of grants, transmit precoding information for (i) a plurality of subbands of a first bandwidth assigned to the second device, and (ii) one or more second bandwidths; transmitting, to the second device in connection with a second of a plurality of grants, transmit precoding information for (i) a plurality of subbands of a third bandwidth assigned to the second device, and (ii) the one or more second bandwidths; and transmitting, to the second device in connection with a third of a plurality of grants, transmit precoding information for (i) a plurality of subbands of a fourth bandwidth assigned to the second device, and (ii) one or more fifth bandwidths.

Among the methods is an eleventh method that may be implemented in a first device configured to communicate with a second device, and may include transmitting, to the second device in connection with a first of a plurality of grants, one or more first SRIs and one or more second SRIs, wherein each of the first SRIs may include a first indication of one or more first SRS ports and first transmit precoding information associated with one of a plurality of subbands of a first bandwidth assigned to the second device, and wherein each of the second SRIs may include a second indication of one or more second SRS ports and second transmit precoding information associated with one of one or more second bandwidths; transmitting, to the second device in connection with a second of a plurality of grants, one or more third SRIs and the second SRIs, wherein each of the third SRIs comprises a third indication of one or more third SRS ports and third transmit precoding information associated with one of a plurality of subbands of a third bandwidth assigned to the second device; and transmitting, to the second device in connection with a third of a plurality of grants, one or more fourth SRIs and one or more fifth SRIs, wherein each of the fourth SRIs may include a fourth indication of one or more fourth SRS ports and fourth transmit precoding information associated with one of a plurality of subbands of a fourth bandwidth assigned to the second device, and wherein each of the fifth SRIs may include a fifth indication of one or more fifth SRS ports and fifth transmit precoding information associated with one of one or more fifth bandwidths.

Among the methods is a twelfth method that may be implemented in a first device configured to communicate with a second device, and may include transmitting, to the second device in connection with a first of a plurality of grants, transmit precoding information for (i) a plurality of subbands of a first bandwidth assigned to the second device, and (ii) one or more second bandwidths; transmitting, to the second device in connection with a second of a plurality of grants, transmit precoding information for (i) a plurality of subbands of a third bandwidth assigned to the second device, and (ii) the one or more second bandwidths; and transmitting, to the second device in connection with a third of a plurality of grants, transmit precoding information for (i) the plurality of subbands of third bandwidth assigned to the second device, and (ii) one or more fourth bandwidths.

Among the methods is a thirteenth method that may be implemented in a first device configured to communicate with a second device, and may include transmitting, to the second device in connection with a first of a plurality of grants, one or more first SRIs and one or more second SRIs, wherein each of the first SRIs may include a first indication of one or more first SRS ports and first transmit precoding information associated with one of a plurality of subbands of a first bandwidth assigned to the second device, and wherein each of the second SRIs may include a second indication of one or more second SRS ports and second transmit precoding information associated with one of one or more second bandwidths; transmitting, to the second device in connection with a second of a plurality of grants, one or more third SRIs and the second SRIs, wherein each of the third SRIs may include a third indication of one or more third SRS ports and third transmit precoding information associated with one of a plurality of subbands of a third bandwidth assigned to the second device; and transmitting, to the second device in connection with a third of a plurality of grants, the third SRIs and one or more fourth SRIs, wherein each of the fourth SRIs may include a fourth indication of one or more fourth SRS ports and fourth transmit precoding information associated with one of one or more fourth bandwidths.

Among the methods is a fourteenth method that may be implemented in a first device configured to communicate with a second device, and may include transmitting, to the second device, signaling indicating transmit precoding information for (i) a plurality of subbands of a first bandwidth assigned to the second device, and (ii) one or more second bandwidths; transmitting, to the second device, signaling indicating transmit precoding information for (i) a plurality of subbands of a third bandwidth assigned to the second device, and (ii) the second bandwidths; and transmitting, to the second device, signaling indicating transmit precoding information for (i) a plurality of subbands of a fourth bandwidth assigned to the second device, and (ii) one or more fifth bandwidths.

Among the methods is a fifteenth method that may be implemented in a first device configured to communicate with a second device, and may include transmitting, to the second device, one or more first SRIs and one or more second SRIs, wherein each of the first SRIs may include a first indication of one or more first SRS ports and first transmit precoding information associated with one of a plurality of subbands of a first bandwidth assigned to the second device, and wherein each of the second SRIs may include a second indication of one or more second SRS ports and second transmit precoding information associated with one of one or more second bandwidths; transmitting, to the second device, one or more third SRIs and the one or more second SRIs, wherein each of the third SRIs may include a third indication of one or more third SRS ports and third transmit precoding information associated with one of a plurality of subbands of a third bandwidth assigned to the second device; and transmitting, to the second device, one or more fourth SRIs and one or more fifth SRIs, wherein each of the fourth SRIs may include a fourth indication of one or more fourth SRS ports and fourth transmit precoding information associated with one of a plurality of subbands of a fourth bandwidth assigned to the second device, and wherein each of the fifth SRIs comprises a fifth indication of one or more fifth SRS ports and fifth transmit precoding information associated with one of one or more fifth bandwidths.

Among the methods is a sixteenth method that may be implemented in a first device configured to communicate with a second device, and may include transmitting, to the second device, signaling indicating transmit precoding information for (i) a plurality of subbands of a first bandwidth assigned to the second device, and (ii) one or more second bandwidths; transmitting, to the second device, signaling indicating transmit precoding information for (i) a plurality of subbands of a third bandwidth assigned to the second device, and (ii) the second bandwidths; and transmitting, to the second device, signaling indicating transmit precoding information for (i) the plurality of subbands of a third bandwidth assigned to the second device, and (ii) one or more fourth bandwidths.

Among the methods is a seventeenth method that may be implemented in a first device configured to communicate with a second device, and may include transmitting, to the second device, one or more first SRIs and one or more second SRIs, wherein each of the first SRIs may include a first indication of one or more first SRS ports and first transmit precoding information associated with one of a plurality of subbands of a first bandwidth assigned to the second device, and wherein each of the second SRIs may include a second indication of one or more second SRS ports and second transmit precoding information associated with one of one or more second bandwidths; transmitting, to the second device, one or more third SRIs and the second SRIs, wherein each of the third SRIs may include a third indication of one or more third SRS ports and third transmit precoding information associated with one of a plurality of subbands of a third bandwidth assigned to the second device; and transmitting, to the second device, the third SRIs and one or more fourth SRIs, wherein each of the fourth SRIs may include a fourth indication of one or more fourth SRS ports and fourth transmit precoding information associated with one of one or more fourth bandwidths.

Also among the methods is an eighteenth method that may be implemented in the second device and may include receiving the signaling from the first device. In various embodiments, the eighteenth method may include any of determining, from the transmit precoding information, a plurality of precoders corresponding to the plurality of subbands; performing precoding of assigned resources at the plurality of subbands using the plurality of precoders; determining, from the transmit precoding information, a second precoder corresponding to at least one segment of the one or more second bandwidths; and performing precoding of the assigned resources at one or more subbands of the first bandwidth other than the plurality of subbands using the second precoder; receiving a grant comprising a resource allocation defining a third bandwidth comprising at least one segment of the second bandwidths; determining, from the transmit precoding information, a third precoder corresponding to the at least one segment; and performing precoding of assigned resources at the at least one segment using the third precoder. The second and third precoders may be the same.

As one skilled in the art will recognize, the second device may carry out methods complementary to the ninth through seventeenth methods using the functions of, or akin to, those disclosed in the eighteenth method.

Representative Examples of Phase-Continuous Precoding

Various types of phase-continuous precoding may be used to allow smooth transition between adjacent precoders. Representative examples of such phase-continuous precoding may include any of (i) phase-continuous precoding using CDD, (ii) phase-continuous precoding with non-zero edge smoothing, (iii) phase-continuous precoding with phase transition region, and (iv) phase-continuous precoding for non-contiguous transmission.

Representative Phase-Continuous Precoding using Cyclic Delay Diversity Example(s)

Figure 3:
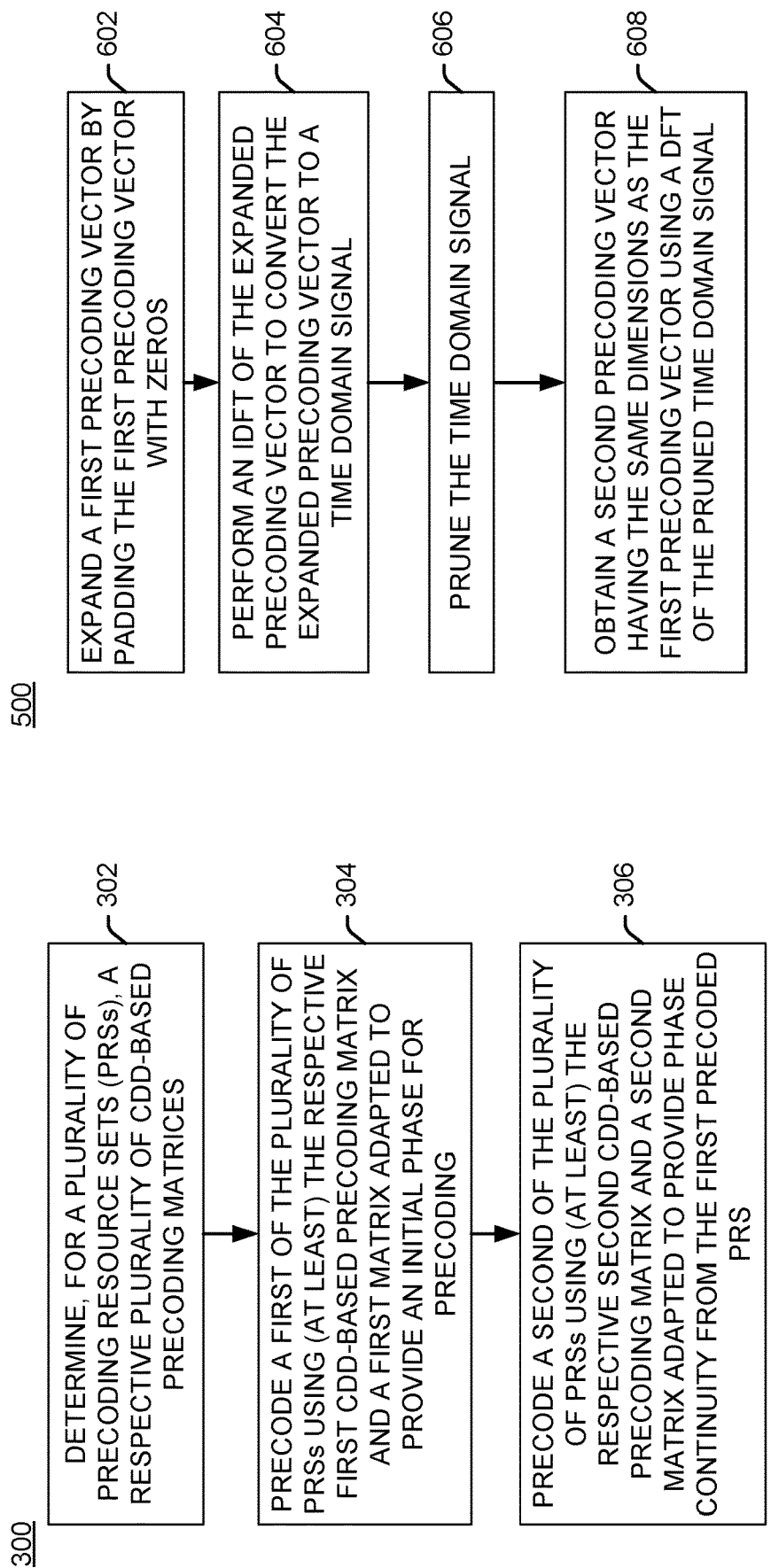
FIG. 3 is a flow chart illustrating a representative procedure for performing phase-continuous precoding using cyclic delay diversity (CDD).

FIG. 3 is a flow chart illustrating a representative procedure 300 for performing phase-continuous precoding using CDD. The representative procedure 300 may be implemented in a device such as a base station (e.g., any of the base stations 114, eNode-Bs 160, gNBs 180 and base stations 202) or a WTRU (e.g., any of the WTRUs 102 and WTRUs 204). The representative procedure 300 may be implemented in a device other than a base station and a WTRU as well.

As shown in FIG. 3, the device may determine, for a plurality of precoding resource sets (PRSs), a respective plurality of CDD-based precoding matrices (302). The device may precode a first PRS of the plurality of PRSs using (at least) the respective first CDD-based precoding matrix of the plurality of CDD-based precoding matrices and a first matrix adapted to provide an initial phase for precoding (304). The device may precode a second PRS of the plurality of PRSs using (at least) the respective second CDD-based precoding matrix of the plurality of CDD-based precoding matrices and a second matrix adapted to provide phase continuity from the first precoded PRS (306).

In an embodiment, the device may determine the respective plurality of CDD-based precoding matrices at least in part by determining, for each (or any) PRS of the plurality of PRSs, a cyclical delay parameter for that PRS. The cyclical delay parameter may be specific to the PRS. In an embodiment, the device may determine the respective plurality of CDD-based precoding matrices at least in part by adapting the CDD-based precoding matrix for each (or any) PRS using the determined cyclical delay parameter specific to that PRS.

In an embodiment, the second matrix may be adapted to provide phase continuity from the first precoded PRS by forcing a starting phase of a cyclical phase shift of the second PRS to start from an ending phase of a cyclical phase shift of the first PRS. In an embodiment, each PRS may include a fraction, or a bundle, of resource blocks.

A MIMO system with $N_{RB}$ scheduled resource blocks for transmission may be considered where the $N_{RB}$ scheduled resource blocks may or may not be contiguous. Each $N_{RB}$ scheduled resource block may define $M_{RE}$ resource elements.

In an embodiment, the frequency selective phase-continuous precoding may be constructed and/or defined as $y=W_1 W_2 x$, where $W_1$, $W_2$ may be first and second beamforming matrices, and x may be a vector of transmit symbols. The first beamforming matrix $W_1$ may be determined as a wideband precoder for the entire scheduled channel. A choice of $W_1 = I$, where I is an identity matrix, transforms the system to a single precoder operation.

In an embodiment, the second beamforming matrix $W_2$ may be defined as a CDD beamforming operation that results in an artificial frequency selective channel. For example, the second beamforming matrix $W_2$ may be defined as:

$$W_2 = W_{CDD} S \quad (1)$$

where $W_{CDD}$ represents the CDD beamforming operation that results in an artificial frequency selective channel, and where matrix S may be a configurable precoding matrix. The matrix S, may be any of an identity, Hadamard, an LTE-based precoder, etc. Alternatively, the matrix S may be dynamically configured or cycled over a predefined set of potential precoders.

The second beamforming matrix $W_2$ and/or the CDD beamforming matrix, $W_{CDD}$, may be defined per set of $N_{RE}$ resource elements. A PRS may be defined as a fraction, or a bundle, of resources blocks, such that the number of resources elements per PRS is $N_{RE} \leq M_{RE}$. The number of PRSs in a scheduled transmission may be represented by $N_{PRS}$.

In an OFDM-based system with an inverse fast Fourier transform (IFFT) size of $N_{IFFT}$, $N_{RE}$ resource elements per PRS and v antenna ports, a CDD-based beamforming matrix $W_2$ and a CDD beamforming matrix, $W_{CDD}$, for the $l_{th}$ PRS may be defined as a diagonal matrix, as follows:

$$W_{2(l,i)} = \Theta_l \begin{bmatrix} 1 & 0 & \cdots & 0 \\ 0 & e^{-j\frac{2\pi \kappa_l i}{N_{RE}}} & \ddots & \vdots \\ \vdots & \ddots & \ddots & 0 \\ 0 & \cdots & 0 & e^{-j\frac{2\pi \kappa_l i(v-1)}{N_{RE}}} \end{bmatrix}_{v \times v} \quad (2a)$$

$$W_{CDD(l,i)} = \Theta_l \begin{bmatrix} \ddots & 0 & 0 \\ 0 & e^{-j\frac{2\pi \kappa_l i(v-2)}{N_{RE}}} & 0 \\ 0 & 0 & e^{-j\frac{2\pi \kappa_l i(v-1)}{N_{RE}}} \end{bmatrix}_{v \times v} \quad (2b)$$

where $\kappa_l \in \mathcal{R}^{30}$ is a cyclic delay parameter; i is subcarrier index within the $l_{th}$ PRS, where $0 \leq i \leq N_{RE} - 1$; and l represents the PRS index, where $1 \leq l \leq N_{PRS}$. The matrix $\Theta_l$ is a diagonal matrix that enforces an initial phase offset. For the first PRS (l=1), if no phase offset is desired, then the matrix $\Theta_l$ may be set to identity (e.g., the matrix $\Theta_1 = I$). Each of the l PRSs may feature a different $\kappa_l$ parameter, and each RE may be precoded differently.

To assure phase continuity of the effective channel across the l PRSs, the matrix $\Theta_l(l>1)$ may be modified as follows:

$$\Theta_l = W_{2(l-1, N_{RE}-1)} \quad (3a)$$

$$= \begin{bmatrix} 1 & 0 & \cdots & 0 \\ 0 & e^{-j\frac{2\pi \kappa_{l-1}(N_{RE}-1)}{N_{RE}}} & \ddots & \vdots \\ \vdots & \ddots & \ddots & 0 \\ 0 & \cdots & 0 & e^{-j\frac{2\pi \kappa_l(N_{RE}-1)(v-1)}{N_{RE}}} \end{bmatrix}_{v \times v}$$

$$\Theta_l = W_{CDD(l-1, N_{RE}-1)} \quad (3b)$$

$$= \Theta_{l-1} \begin{bmatrix} \ddots & 0 & 0 \\ 0 & e^{-j\frac{2\pi \kappa_{l-1}(N_{RE}-1)(v-2)}{N_{RE}}} & 0 \\ 0 & 0 & e^{-j\frac{2\pi \kappa_{l-1}(N_{RE}-1)(v-1)}{N_{RE}}} \end{bmatrix}_{v \times v}$$

where such matrix $\Theta_l(l>1)$ may represent a phase state of the precoder of a last subcarrier of a previous one of the l PRSs. Inclusion of the matrix $\Theta_l$ may cause a starting phase of the cyclical phase shift of the $l_{th}$ PRS to start from a last CDD phase of the $(l_{th}-1)$ PRS. A benefit of using the matrix $\Theta_l$ is that abrupt phase transitions over the boundaries of the l PRSs may be mitigated. The representative phase-continuous precoding using CDD provided herein may also be used for non-contiguous resource blocks assuming the non-contiguous resource blocks are in close proximity (e.g., one of the non-contiguous resource blocks is in close proximity to another one of the non-contiguous resource blocks).

In an embodiment, a transmitter unit may select the cyclic delay parameter $\kappa_l$ per PRS from a set of predefined values. The predefined set may be fixed or configurable. The fixed set may be defined or derived based on a cell-based feature, such as system bandwidth or deployment requirement, e.g., urban vs. suburban. The configurable set may be defined or derived based on any of mobility status of a WTRU, multi-user MIMO (MU-MIMO) requirement; and MIMO channel characteristics (e.g., rank).

The cyclic delay parameter $\kappa_l$ may be adaptively selected based on an estimated CSI per PRS. The estimated CSI may be based on any of a direct measurement on reference signals, a reported value and channel reciprocity. By adaptive adjustment of the cyclic delay parameter $\kappa_l$, the frequency selectivity of the effective channel per PRS may be adjusted across the antennas. The resulting adjustment across the antennas may be to optimize a MIMO performance metric, for example. The metric optimization may include any of maximizing capacity, maximizing SNR/SINR/SNLR, etc.

Figure 4:
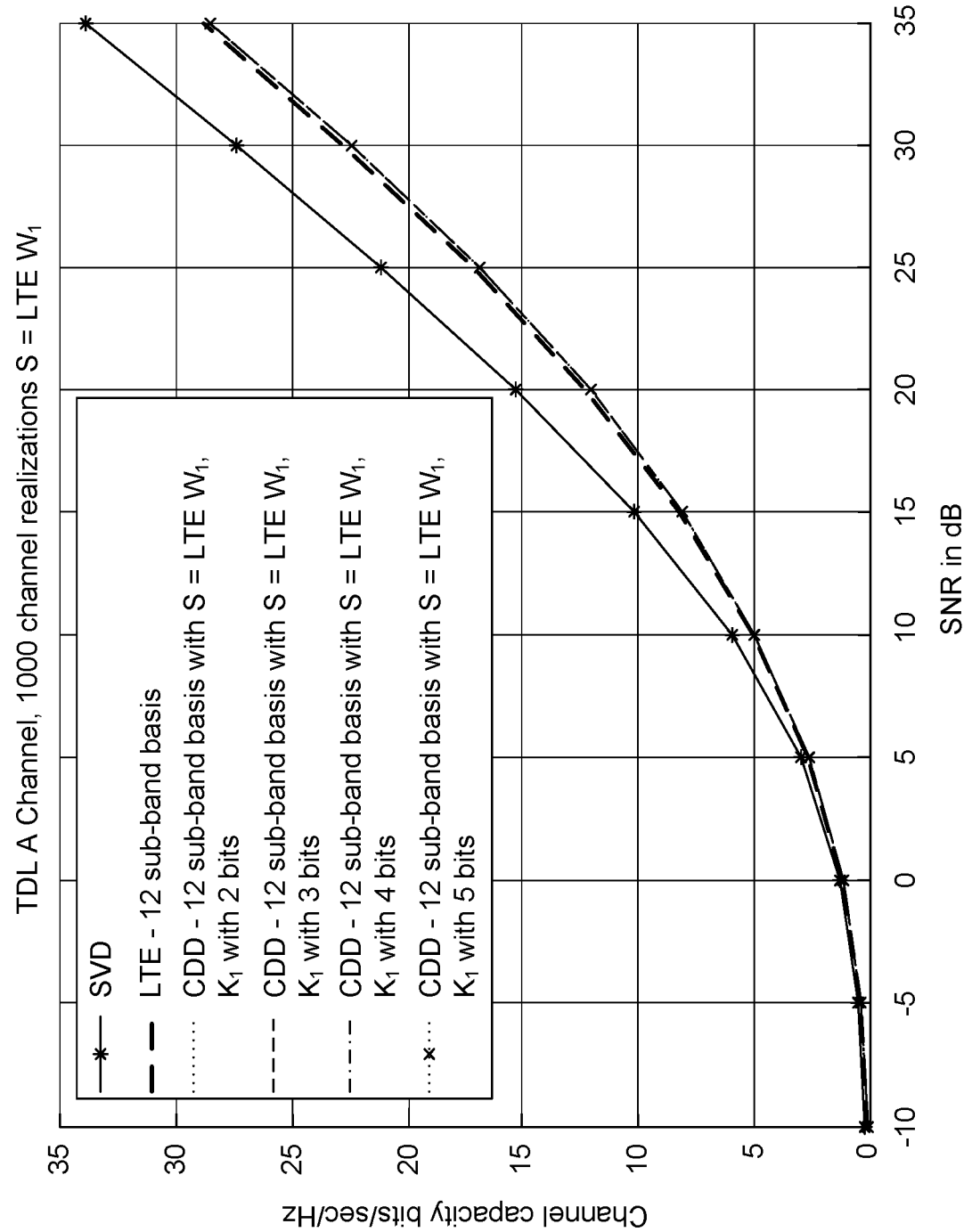
FIG. 4 is a graph illustrating a capacity comparison of adaptive CDD precoding with other precoding mechanisms.

FIG. 4 is a graph illustrating a capacity comparison of adaptive CDD precoding with other precoding mechanisms. The comparison is based on capacity estimates of a 4×4 MIMO system. As the benchmark, computed capacities of a full SVD and LTE-based beamforming are shown. For the presented evaluation, MMSE beamforming was used. In the case of adaptive CDD, different values or resolution/step for cyclic delay parameter $\kappa_l$ were used. As shown, the LTE-based precoding and adaptive CDD perform similarly. And as can be readily discerned, no notable improvement is exhibited when high resolution feedback for cyclic delay parameter $\kappa_l$ is used.

The cyclic delay parameter $\kappa_l$ may be selected based on any of WTRU mobility and channel characteristics (e.g., for open loop MIMO). Alternatively, the cyclic delay parameter $\kappa_l$ may be selected randomly or cycled over a predefined set of values.

For UL MIMO, a WTRU may determine the cyclic delay parameter $\kappa_l$ set from control signaling, such as any of RRC signaling and dynamic L1 control signaling. Alternatively, a WTRU may autonomously determine the best cyclic delay parameter $\kappa_l$.

The WTRU may indicate to the network that it is using per-tone precoding (and/or indicate that it is using per-tone precoding and not wideband precoding) by transmitting one bit of feedback. The WTRU may indicate to the network the cyclic delay parameter $\kappa_l$ set determined by the WTRU from a pre-specified set of cyclic delay parameters $\kappa_l$ that can be used by the network for UL multi-user MIMO operation. This information may be transmitted on any of an UL feedback channel, an UL data associated control channel and UL data.

For open-loop MU-MIMO, each co-scheduled WTRU may use a different set of parameters for CDD precoding. Alternatively, each co-scheduled WTRU may use the same set (or different non-orthogonal set) of parameters for CDD precoding because there is no need to have orthogonal precoders across multiple WTRUs transmitting on the same allocation. The network may have an option to indicate the set of CDD parameters to the co-scheduled WTRUs. The WTRU should (but need not) follow the information provided by the network in determining its CDD parameters.

Figure 5:
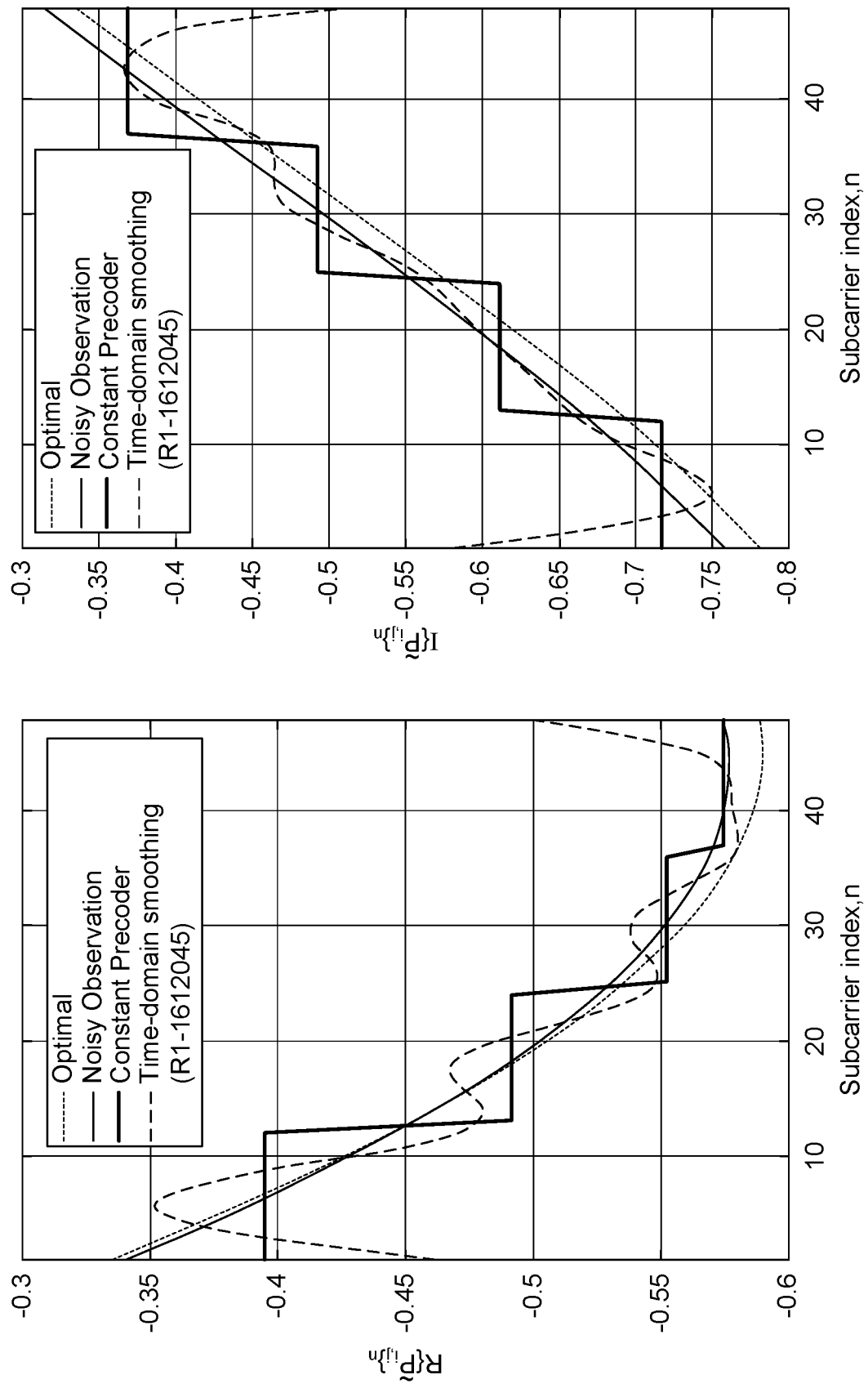
FIG. 5 includes two graphs illustrating distortion of edge elements of a time-domain smoothing precoder.

A procedure that smooths time-representations of precoding vectors so as to ensure the impact of precoder on the data symbols are continuous has been proposed in [1]. The proposal in [1] appears to rely on a supposition that, if a precoding vector $p_{i,j}$ has high frequency components, then by pruning in its dual domain, i.e., time, it is possible to make the precoding vector smooth in frequency. However, when the high-frequency components are pruned and converted back to time via a DFT operation as proposed, the first and last elements of $p_{i,j}$ may be distorted (e.g., significantly distorted). The distortion is believed to be due to the fact that puncturing in frequency corresponds to a circular filtering operation; the result of which is that the first and last elements of the vector $q_{i,j}$ become similar to each other. However, in practice, the last and first elements of $p_{i,j}$ may be different, wherein the significance of such difference depends on the size of $p_{i,j}$. For example, if there are 48 subcarriers, i.e., M=48, the precoding vector may be in $\mathbb{C}^{48 \times 1}$. After pruning 40 components in time-domain and converting it to frequency domain causes the vector to have edge elements significantly distorted, as shown in FIG. 5.

Representative Phase-Continuous Precoding with Non-Zero Edge Smoothing Example(s)

FIG. 6 is a flow chart illustrating a representative procedure 600 for performing phase-continuous precoding with non-zero edge smoothing. The representative procedure 600 may be implemented in a device such as a base station (e.g., any of the base stations 114, eNode-Bs 160, gNBs 180 and base stations 202) or a WTRU (e.g., any of the WTRUs 102 and WTRUs 204). The representative procedure 600 may be implemented in a device other than a base station and a WTRU as well.

As shown in FIG. 6, the device may expand a first precoding vector by padding the first precoding vector with zeros, e.g., at its head and tail (602). The device may perform an IDFT of the expanded precoding vector to convert the expanded precoding vector to a time domain signal (604). The device may prune the time domain signal (606). The device may perform a discrete Fourier transform (DFT) of the pruned time domain signal so as to form a second precoding vector (608). The second precoding vector may have the same dimensions as the first precoding vector.

In an embodiment, the device may expand the first precoding vector (602), at least in part, by any of (i) inputting zeros at head and/or tail inputs of the IDFT, and (ii) inputting the precoding vector to inputs of the IDFT between the head and tail inputs of the IDFT. In an embodiment, the device may prune the time domain signal (606), at least in part, by setting one or more elements of the time domain signal to zero. Such elements of the time domain signal may include a group or a set of elements that correspond to high frequency components of the time domain signal.

In an embodiment, the frequency selective phase-continuous precoding may be constructed and/or defined as $y=W_1 W_2 x$, where $W_1$, $W_2$ are first and second beamforming matrices, and x is a vector of transmit symbols. The first beamforming matrix $W_1$ may be determined as a wideband precoder for the entire scheduled channel. A choice of $W_1 = I$ for the first beamforming matrix, where I is an identity matrix transforms the system to a single precoder operation.

In an embodiment, the second beamforming matrix $W_2$ the may include several precoding vectors. For example, the second beamforming matrix $W_2$ may be choosen as $\{\tilde{P}_1, \tilde{P}_2, \ldots, \tilde{P}_m, \ldots, \tilde{P}_M\}$, where diag$\{\cdot\}$ is an operator for block diagonalization and $\tilde{P}_m$ is a derived precoding matrix for mth subcarrier or subblock. The derived precoding matrix $\tilde{P}_m$ may be based on a set of original precoders $\{P_1, P_2, \ldots, P_k, \ldots, P_K\}$. The precoding vector $p_{i,j}$ may be a column vector, as $[\{P_1\}_{i,j}, \{P_2\}_{i,j}, \ldots, \{P_m\}_{i,j}, \ldots, \{P_M\}_{i,j}]^T$ where its mth element is populated with the element located on ith row and jth column of the precoding matrix $P_m$ for mth subcarrier or subblock. The precoding vector $p_{i,j}$ may be expanded to a vector $\tilde{P}_{i,j} = [h_{i,j}^T \ p_{i,j}^T \ t_{i,j}^T]^T \in \mathbb{C}^{M+T \times 1}$, where $h_{i,j} \in \mathbb{C}^{T_1 \times 1}$ and $t_{i,j} \in \mathbb{C}^{T_2 \times 1}$ are functions of $p_{i,j}$ and $T_1+T_2=T$. After the vector $p_{i,j}$ is expanded, a time-domain filtering operation on $\tilde{P}_{i,j}$ may be applied by using the following operations:

1) perform a M+T IDFT,
2) prune the resultant time domain signal (e.g., set some of the elements to zero; for example a group of elements that correspond to higher frequency components), and
3) perform a M+T DFT.

Figure 7:
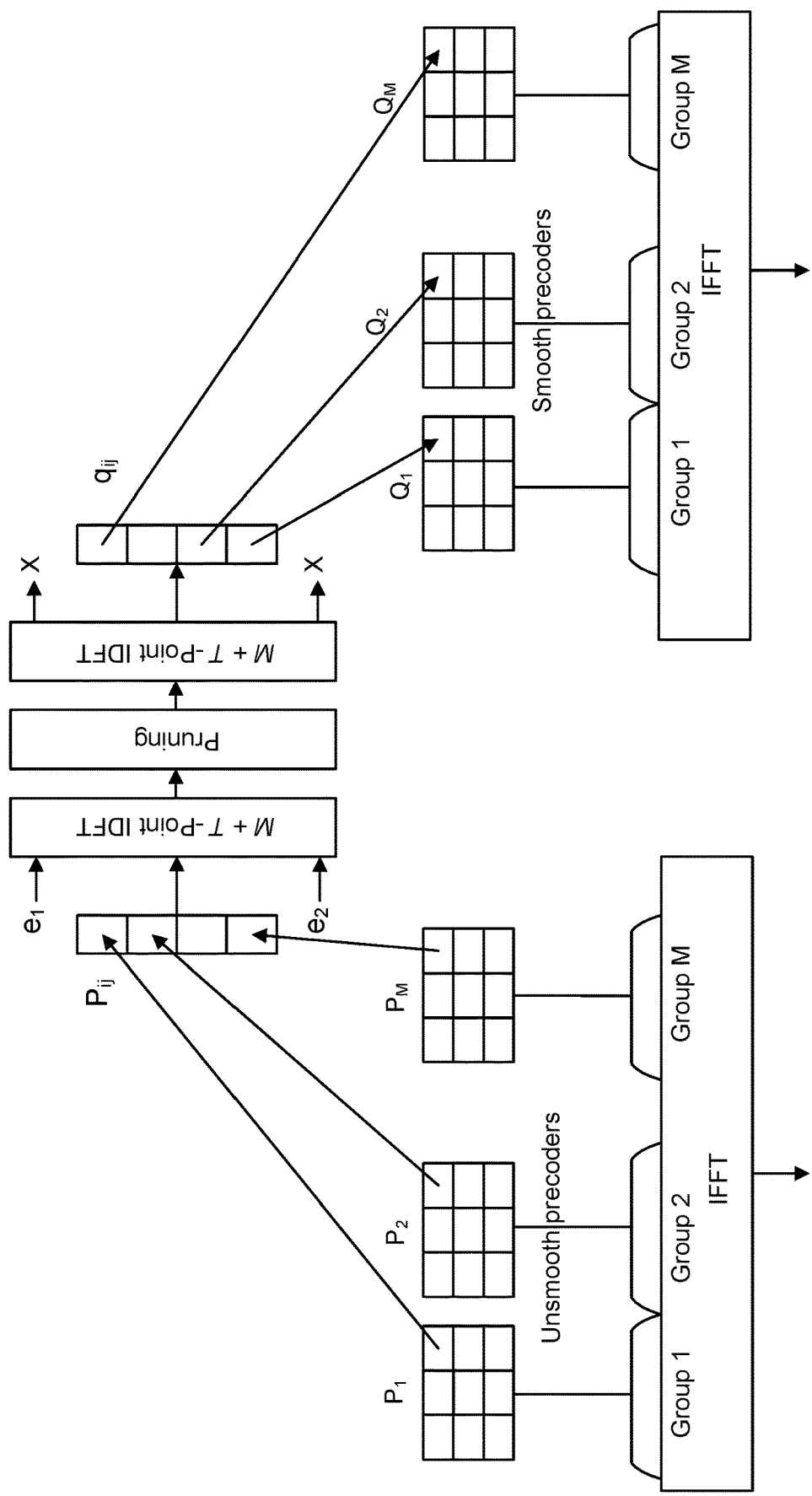
FIG. 7 illustrates an example of phase-continuous precoding with non-zero edge smoothing.

The size of a resulting vector after the time domain filtering operation may be in $\mathbb{C}^{M+T \times 1}$. The first $T_1$ and the last $T_2$ elements of the resulting vector may be punctured. A result of the forgoing operations is that distorted elements are removed. FIG. 7 illustrates an example flow of the foregoing operations.

Figure 8:
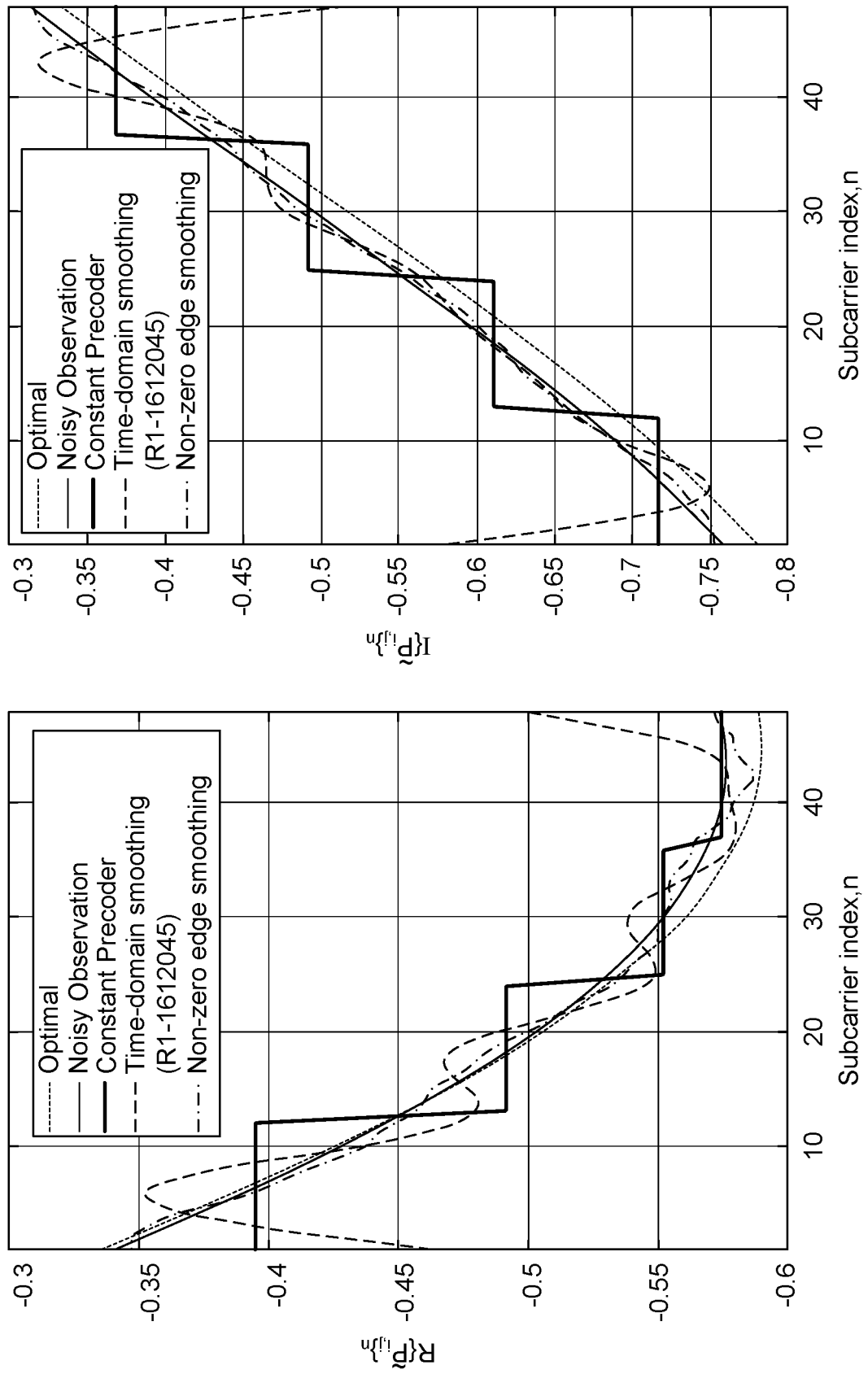
FIG. 8 includes two graphs illustrating a performance comparison of phase-continuous precoding with non-zero edge smoothing and other precoding methods.

Without loss of generality, $h_{i,j} \in \mathbb{C}^{T_1 \times 1}$ and $t_{i,j} \in \mathbb{C}^{T_2 \times 1}$ may be derived based on $p_{i,j}$. For example, $\{h_{i,j}\}_k = \{p_{i,j}\}_1$, $\{t_{i,j}\}_m = \{p_{i,j}\}_M$, i.e., the elements of $h_{i,j}$ are identical and equal to the first element of $p_{i,j}$ and the elements of $t_{i,j}$ are identical and equal to the last element of $\{h_{i,j}\}_k = 2\{p_{i,j}\}_1 - \{p_{i,j}\}_2$, $[t_{i,j}]_m = 2\{p_{i,j}\}_M - \{p_{i,j}\}_{M-1}$, i.e., the elements of $h_{i,j}$ are identical and derived based on the differentiating first two consecutive samples, and the elements of $t_{i,j}$ are identical and derived based on the differentiating last two consecutive samples FIG. 8 includes two graphs illustrating a performance comparison of phase-continuous precoding with non-zero edge smoothing and other precoding methods In FIG. 8, the performance of the phase-continuous precoding with non-zero edge smoothing is compared with the method given in [1] and the real and imaginary parts of $\{\tilde{P}_{i,j}\}_n$ are plotted, where n is the subcarrier index. While the method in [1] causes significant distortion on the edge elements of $\tilde{P}_{i,j}$, application of the phase-continuous precoding with non-zero edge smoothing results in significantly less distortion on the edges.

Representative Phase-Continuous Precoding with Phase Transition Region Example(s)

Figures 9, 11:
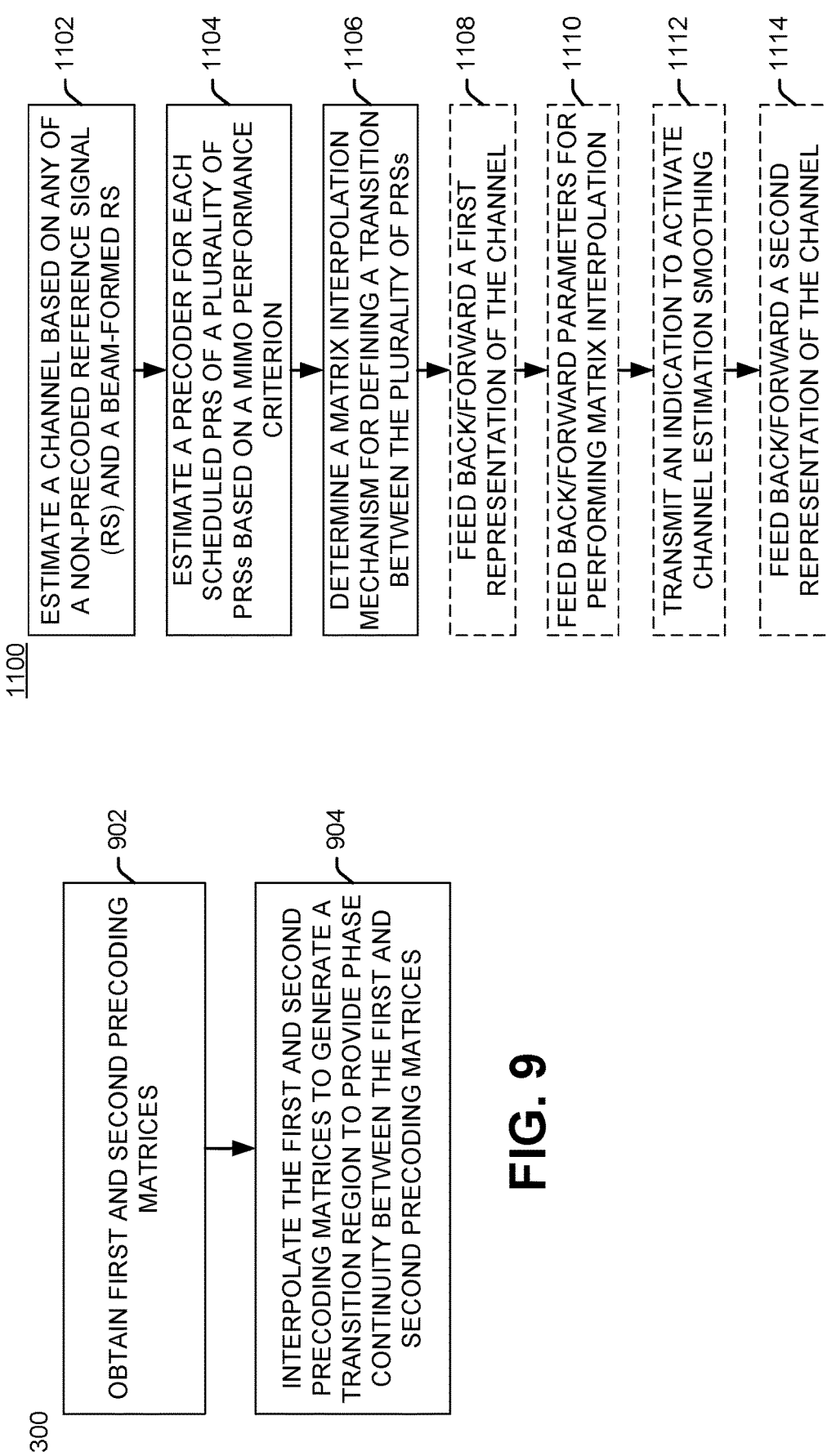
FIG. 9 is a flow chart illustrating a representative procedure for performing phase-continuous precoding with a phase transition region.
FIG. 11 is a flow chart illustrating a representative procedure for performing phase-continuous precoding with one or more phase transition regions.

FIG. 9 is a flow chart illustrating a representative procedure 900 for performing phase-continuous precoding with a phase transition region. The representative procedure 900 may be implemented in a device such as a base station (e.g., any of the base stations 114, eNode-Bs 160, gNBs 180 and base stations 202) or a WTRU (e.g., any of the WTRUs 102 and WTRUs 204). The representative procedure 900 may be implemented in a device other than a base station and a WTRU as well.

As shown in FIG. 9, the device may obtain first and second precoding matrices (e.g., from one or more codebooks) (902). The device may interpolate the first and second precoding matrices to generate a transition region to provide phase continuity between the first and second precoding matrices (904). The transition region may have a length, and the length of the transition region may be fixed or configurable.

Figure 10:
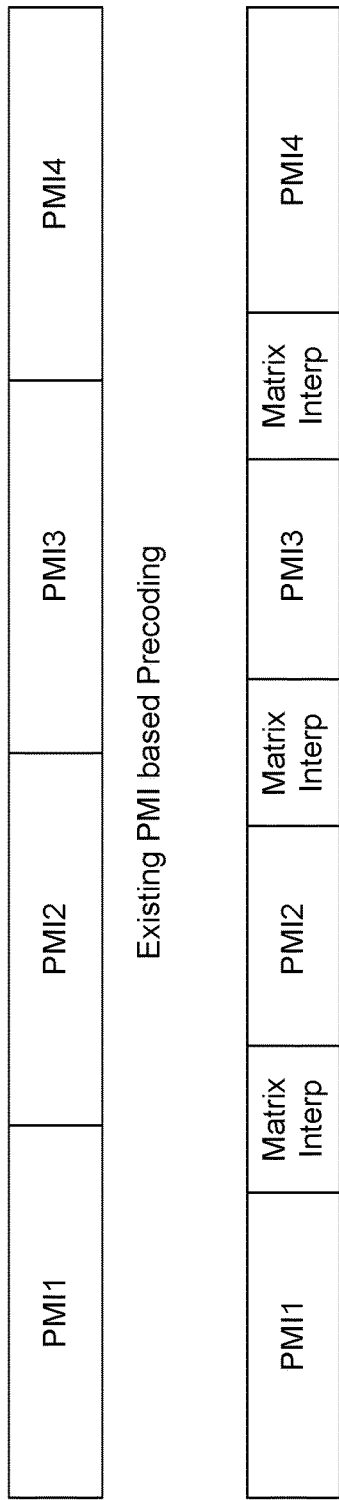
FIG. 10 illustrates an example of phase-continuous precoding with phase transition regions.

In an embodiment, phase-continuous precoding may be supported by creating a codebook in which every precoder selection is pairwise continuous with the any other member of the codebook. As an alternative, matrix interpolation may be employed to facilitate a soft phase transition across PRS boundaries. In this alternative, a fixed or dynamic phase-continuous transition region may be created based on, or along with, an existing codebook. The transition region may use a defined matrix interpolation scheme in the codeword transitions. A simple example of this is shown in the FIG. 10. As shown, rather than an abrupt transition between PMI1 and PMI2, a transition region is defined between the two resources that transitions PMI1 to PMI2 in a phase-continuous manner. The length of the interpolation region may be fixed or configurable by higher layer signaling or L1 control.

FIG. 11 is a flow chart illustrating a representative procedure 1100 for performing phase-continuous precoding with one or more phase transition regions. The representative procedure 1100 may be implemented in a first device, such as a base station (e.g., any of the base stations 114, eNode-Bs 160, gNBs 180 and base stations 202) or a WTRU (e.g., any of the WTRUs 102 and WTRUs 204). The representative procedure 1100 may be implemented in a device other than a base station and a WTRU as well.

To carry out the representative procedure 1100, the first device may communicatively couple with a second device. The second device may be a base station (e.g., any of the base stations 114, eNode-Bs 160, gNBs 180 and base stations 202) or a WTRU (e.g., any of the WTRUs 102 and WTRUs 204). In an embodiment, the second device may be a base station if the first device is a WTRU. Alternatively, the second device may be a WTRU if the first device is a base station.

As shown in FIG. 11, the first device may estimate a channel based on a non-precoded reference signal (RS) or a beam-formed RS (1102). A beamformer may be used in addition to a precoder. The first device may estimate a precoder (e.g., a "best" precoder) for each scheduled PRS of a plurality of PRSs based on a MIMO performance criterion (1104). The first device may estimate or otherwise determine a matrix interpolation mechanism (e.g., a "best" matrix interpolation mechanism) for a transition region between each (or at least two) PRSs of the plurality of PRSs (1106). In an embodiment, the first device may determine the matrix interpolation mechanism estimation, at least in part, by any of defining the transition region(s) and determining matrix interpolation parameters based on one or more system parameters. The transition region(s) may be region(s) over which the matrix interpolation may be performed. In an embodiment, the matrix interpolation parameters may include any of envelope characteristics and sub-space or inter-column interference parameters. The envelope characteristics may include constant modulus and/or cubic-metric requirements. The sub-space or inter-column interference parameters may include column-wise orthogonality and/or semi-orthogonality parameters. In an embodiment, the transition region(s) may be fixed and/or standardized. In an embodiment, the transition region(s) may be dynamically estimated based on channel or scheduled transmission bandwidth. For example, the transition region(s) may be defined based on frequency selectivity of the channel and/or mobility.

As an option, (e.g., in a non-reciprocal system), the first device may feed back/forward toward the second device a representation of the channel (1108). The representation of the channel may include a PMI for the transmission in the control channel. Alternatively, the representation of the channel may include any of one or more PMIs and one or more SNRs.

As an option, the first device may feed back/forward toward the second device one or more parameters for performing the matrix interpolation (1110).

The second device may construct a precoder (not shown). The second device may transmit precoded information to the first device (not shown). The second device may inform the first device to indicate the use of a phase-continuous precoder and/or other indication to activate channel estimation smoothing (not shown).

The first device may transmit to the second device an indication of the use of a phase-continuous precoder and/or other indication to activate channel estimation smoothing (1112). The first device may feed back/forward toward the second device a second (in time) representation of the channel (1114). The second representation of the channel may include any of one or more PMIs and one or more SNRs.

The second device may construct a phase-continuous precoder based at least in part on the reconstructed quantized channel.

The second device may receive the second representation of the channel (not shown). The second device may reconstruct the quantized channel based at least in part on the second representation (not shown). The second device may construct a phase-continuous precoder based at least in part on the reconstructed quantized channel. Alternatively, the second device may construct a phase-continuous precoder using any of the methods discussed herein.

Representative Phase-Continuous Precoding for Non-Contiguous Transmission Example(s)

In an embodiment, the first and second devices may treat all non-contiguous groups independently and may allow channel estimation smoothing only within contiguous PRSs. Alternatively, a parameter defining a (e.g., maximum) inter-PRS distance for smoothing may be specified. The parameter may be static, semi-static or dynamic. Resources that are greater than or do not fall within the specified inter-PRG distances may be processed independently.

In an embodiment, the second device may send to the first device information in the scheduling grant that identifies PRSs that may be processed together. Additional information such as weighting factors may be sent between the first and second devices to assist with smoothing procedures. Alternatively, the first device may semi-blindly test different methods and compare with information sent by the second device. This may be sent in a control channel. The control channel may be the channel or channels in which the second device sends to the first device a value of channel estimate at the boundary between PRSs for comparison.

Representative Transmission Aspects and Procedures

Representative Phase-Continuous Precoding Capability Exchange and Signaling Example(s)

The gNB's capabilities may be signaled during initialization in the NR-PBCH and carried in the Master Information Block (MIB) or one of the System Information Blocks (SIGs). As this information might not be necessary for WTRU start-up, the information may be signaled in a lower hierarchy (or secondary PBCH) in the case of a hierarchical or multi-level NR-PBCH that transmits only essential information first A WTRU's capability information may be provided to the network in a capability Information Element (IE), which may be signaled as a Chest Phase Continuity IE. The WTRU Capability IE may be an RRC message that the WTRU sends to network (in most cases during initial registration process). The WTRU Capability IE may inform on all the details of its capabilities. An example of WTRU Capability IE may be as follows:

ENUMERATED {phase_cont_channel, phase_cont_PMI, both, none, spare}, where "phase_cont_channel" may indicate that the WTRU supports phase-continuous precoder design based on the channel estimate, "phase_cont_PMI" may indicate that the WTRU supports PMI based phase-continuous precoders, "both" may indicate that the WTRU supports both methods, "none" may indicate that the WTRU does not support phase-continuous precoder design, and "spare" is reserved for future usage.

Alternatively, the transmitter (the gNB and/or WTRU) may indicate if a specific transmission is using phase-continuous precoders in the control channel (the NR-PDCCH for downlink transmission and the NR-PUCCH for UL transmission).

Note that in a downlink multi-user transmission with receivers that are a mix of phase-continuous precoder capable and not, the transmitter may have the following options:
1. Transmit using Phase-Continuous precoders only.
2. Transmit using non-Phase-Continuous precoders only.
3. Transmit using a mix of phase-continuous and non-Phase-Continuous precoders.

In the uplink multi-user transmission scenario, each WTRU may transmit independently and signal the gNB based on what is using. In one method, the gNB may restrict WTRU that are not capable of phase-continuous precoding from joining the network.

The one-bit information regarding the per-tone precoding vs wideband precoding can be transmitted on the UL control channel which carries ACK/NACK (e.g., PUCCH). Alternatively, the WTRU may indicate the one-bit information implicitly by embedding it into the DMRS. For example, the DMRS may be scrambled with a unique sequence for the per-tone precoding mode of operation and with a different scrambling sequence for wideband precoding mode of operation.

As an alternative, the information regarding the per-tone DL precoding can be implicitly indicated by the size of the PRG. The WTRU may determine activation of the per-tone precoding from the size of the DL scheduling grant. A DL scheduling grant with a specific size may indicate per-tone precoding at gNB, for example.

In LTE, the sizes of the RBG and PRG are defined or determined as functions of the system bandwidth, as listed in Table 1 below.

TABLE 1

| System BW (MHz) | RBG Size | PRG Size |
|---|---|---|
| 1.4 | 1 | 1 |
| 3 | 2 | 2 |
| 5 | 2 | 2 |
| 10 | 3 | 3 |
| 15 | 4 | 2 |
| 20 | 4 | 2 |

In an embodiment, any contiguous scheduling selected from a pre-defined set of RBG sizes may indicate a PRG size as wide as any of the size of the scheduled RBs and other (e.g., predefined) value. A WTRU may detect per-tone precoding if it determines the size of contiguous scheduling RBs belongs to a pre-defined set. For example, in contrast to the entries in Table 1, any contiguous scheduling with RBG≥4 may indicate a PRG size as wide as the size of the scheduled RBs. And a WTRU may detect per-tone precoding if it determines a contiguous scheduling with RBG≥4.

In a localized or a distributed transmission, the PRG size may be determined from a configured RBG size. The RBG size may be signaled or otherwise provided on any of a dynamic and semi-static basis, and any of L1, L2 and higher layer control signaling and/or channels.

For a given RBG size configuration, the PRG size may be determined from the size of one or more contiguous parts of the scheduled transmission. In an embodiment, with a localized or a distributed transmission scheduled with contiguous parts of equal to or wider than x RBGs, the PRG size may be determined (e.g., set) as wide as the span of the contiguous part of the transmission, or by another pre-defined rule. Table 2 shows an exemplary case where the PRG size is increased from 2 to 4 RBs if the scheduled transmission has contiguous parts of wider than x RBGs.

TABLE 2

| System BW (MHz) | RBG Size | PRG Size |
|---|---|---|
| 1.4 | 1 | 1 |
| 3 | 2 | 2 |
| 5 | 2 | 2 |
| 10 | 3 | 3 |
| 15 | 4 | 2 |
| 15 (If contiguous parts are wider than x RBGs) | 4 | 4 |
| 20 | 4 | 2 |
| 20 (If contiguous parts are wider than x RBGs) | 4 | 4 |

In an embodiment, an information element or other portion (collectively "IE") of a downlink control information (DCI) may be used to indicate whether to use a predefined PRG size for an UL/DL transmission, for example, a transmission of 1 or 2 PRBs. The DCI IE may be as small as a single bit. The DCI IE may be (e.g., set to) one value to indicate to a WTRU to use of the predefined PRG size for the UL/DL transmission. Alternatively, the DCI IE may be (e.g., set to) another value to a signal to the WTRU to use an alternate rule to determine the PRG size. If the DCI IE is more than one bit, the DCI IE may be (e.g., set to) one of multiple different values to signal to the WTRU to use a respective one of multiple alternative rules to determine the PRG size. Hereafter, DCI IE may be interchangeably used with DCI bit, DCI bit field, DCI field, DCI code point, DCI state of a DCI field, and DCI state.

In an embodiment, absence of the DCI IE or DCI without such DCI IE, such as a particular DCI format, may operate as a (e.g., implicit) signal to the WTRU to use the alternate rule or to use one or more to the multiple alternative rules for determining the PRG size.

In an embodiment, the alternate/alternative rule for determining the PRG size may be (e.g., be defined) based on the size of RBG, e.g., PRG_size=k*RBG_size, where k may be a real non-zero number (e.g., a positive integer number).

Alternatively, the alternate/alternative rule for determining the PRG size may be based on and/or related to the bandwidth part and/or the scheduled bandwidth. In an embodiment, the alternate/alternative rule for determining the PRG size may be based on (and/or implemented using) Table 3 and where x may be a configured, predefined fixed value, or determined by assistance information (e.g., UE assistance information) or feedback. Table 3 lists representative examples of the RBG and PRG sizes for various representative examples of system bandwidth. In an embodiment, the RBG and PRG sizes (e.g., the representative examples thereof listed in Table 3) may be configured per cell, per one or more sectors or other portion of a cell and/or per WTRU. The representative examples of the RBG and PRG sizes and system bandwidth listed in Table 3 are provided for the purpose of illustration only and is not limiting of the disclosed embodiments.

TABLE 3

| System BW (MHz) | RBG Size | PRG Size |
|---|---|---|
| 1.4 | 1 | 1 |
| 3 | 2 | 2 |
| 5 | 2 | 2 |
| 10 | 3 | 3 |
| 15 | 4 | 2 |
| 15 | 4 | 4 |
| Exemplary conditions: | | |
| If the scheduled bandwidth is wider than x RBGs | | |
| If contiguous parts are wider than x RBGs | | |
| If the bandwidth parts are wider than x RBGs | | |
| Etc. | | |
| 20 | 4 | 2 |
| 20 | 4 | 4 |
| Exemplary conditions: | | |
| If the scheduled bandwidth is wider than x RBGs | | |
| If contiguous parts are wider than x RBGs | | |
| If the bandwidth parts are wider than x RBGs | | |
| Etc. | | |

In an embodiment, multiple different PRG sizes may be considered for a given system and/or scheduled bandwidth. The multiple different PRG sizes may include a small PRG size, a large PRG size and one or more mid-range PRG sizes, for example. The small PRG size may be considered and/or used to enable and/or facilitate (e.g., very) narrow-band frequency selective precoding operation and/or precoder cycling. The small PRG size may be small in that it is not as large as the mid-range PRG sizes and/or is small as compared to the scheduled bandwidth (e.g., a small fraction of the scheduled bandwidth). The large PRG size may be as wide as the RBG size or a (e.g., integer) multiple of the RBG size. Alternatively and/or additionally, the large PRG size may be a significant fraction of a scheduled bandwidth part. The large PRG size may be considered and/or used to enable and/or facilitate an improved channel estimation at the receiver (WTRU). Each or any of the mid-range PRG sizes may be based on (e.g., as a function of) the channel frequency selectivity. Each or any of the mid-range PRG sizes may be directly linked to, or otherwise based on, the configured RBG size. As an example, a mid-range PRG size may be based on a function of the configured RBG size, such as PRG=RBG/2^L, where L may be a fixed value per RBG. The multiple different PRG sizes may include max PRG size. The max PRG size may be a wideband bandwidth, a scheduled bandwidth or a maximum allowed bandwidth.

In an embodiment, a selection from among the different configurations (e.g., the above-noted configurations) may be realized by employing an IE ("selection IE"). The selection IE may be as small as a single bit. The selection IE may be signaled or otherwise provided on any of a dynamic and semi-static basis, and any of L1, L2 and higher layer control signaling and/or channels, including, for example, DCI and/or RRC signaling.

In an embodiment, the selection IE may be a single bit of a DCI and may be used to indicate a choice of one option over other options (e.g., one of the small, large, mid-range PRG sizes over the other two PRG sizes). Additionally, selection distinction among the remaining options may be based on any of explicit and implicit UE assistance.

In an embodiment, the selection IE may be a single bit and may be used to indicate the choice of a first option (small PRG size) over the other options (large and mid-range PRG sizes). The selection of a second option (large PRG size) over a third option (a mid-range PRG size) may be based on any of explicit and implicit UE assistance. Alternatively, the selection of a second option (large PRG size) over a third option (a mid-range PRG size) may be based on a one or more parameters of another system configuration, e.g., CSI-RS, etc. Table 4 below lists an example set of values for different values of the selection IE. The selection IE may be a single bit and may be used to indicate PRG size determination method, wherein a first method may be based on an explicit determination and a second method is based on an implicit determination. The explicit determination may use a PRG size which may be configured via a higher layer signaling. The implicit determination may use two PRB sizes and one of the PRG size may be implicitly determined.

TABLE 4

| RBG | Selection IE = 1 Explicit determination PRG (Small) | Selection IE = 0 Implicit determination | |
|---|---|---|---|
| | | PRG (Mid-size) | PRG (Large size) |
| 2 | 1 | 1 | 2 |
| 4 | 1 | 2 | 4 |
| 8 | 1 | 4 | 8 |
| 16 | 1 | 4 | 16 |

There may not be much gain (e.g., in channel estimation accuracy) in using very wide PRG sizes, (e.g., PRG sizes>8), and performance degradation may result in channel with high frequency selectivity. Table 5 below lists examples of two implicitly-determinable PRG size options in addition to an example explicitly-determinable small PRG size option for each RBG size in a system with an RBG size set of {2, 4, 8, 16}. The two implicitly-determinable PRG size options may be mid and large PRG size options. Alternatively, one of the two implicitly-determinable PRG size options may be a max PRG size option. The max PRG size option may be a wideband bandwidth, a scheduled bandwidth or a maximum allowed bandwidth.

TABLE 5

| RBG | IE = 1 Explicit determination PRG (Small) | IE = 0 Implicit determination | |
|---|---|---|---|
| | | PRG (Option 1) | PRG (Option 2) |
| 2 | 1 | 1 | 2 |
| 4 | 1 | 2 | 4 |
| 8 | 1 | 4 | 8 |
| 16 | 1 | 4 | 8 |

Table 6 below lists examples of two implicitly-determinable PRG size options in addition to an example explicitly-determinable wideband (or scheduled bandwidth) PRG size option for each RBG size in a system with an RBG size set of {2, 4, 8, 16}. The two implicitly-determinable PRG size options may be mid and large PRG size options. Alternatively, one of the two implicitly-determinable PRG size options may be a max PRG size option.

TABLE 6

| RBG | IE = 1 Explicit determination PRG | IE = 0 Implicit determination | |
|---|---|---|---|
| | | PRG (Option 1) | PRG (Option 2) |
| 2 | Wideband/Scheduled Bandwidth | 1 | 2 |
| 4 | Wideband/Scheduled Bandwidth | 2 | 4 |
| 8 | Wideband/Scheduled Bandwidth | 4 | 8 |
| 16 | Wideband/Scheduled Bandwidth | 4 | 8 |

Table 7 below lists examples of two implicitly-determinable PRG size options in addition to an example explicitly-determinable wideband (or scheduled bandwidth) PRG size option for each RBG size in a system with an RBG size set of {2, 4, 8, 16}. The two implicitly-determinable PRG size options may be small and large PRG size options. Alternatively, the one of the two implicitly-determinable PRG size options may be any two of small, mid, large and max PRG size options.

TABLE 7

| RBG | IE = 1 Explicit determination PRG | IE = 0 Implicit determination | |
|---|---|---|---|
| | | PRG (Option 1) | PRG (Option 2) |
| 2 | Wideband/Scheduled Bandwidth | 1 | 2 |
| 4 | Wideband/Scheduled Bandwidth | 1 | 4 |
| 8 | Wideband/Scheduled Bandwidth | 1 | 8 |
| 16 | Wideband/Scheduled Bandwidth | 1 | 8 |

In an embodiment, an implicit indication may be used to over-ride the role of selection IE to indicate use of a small PRG size (or any of other option). An example of a condition triggering the implicit indication may be based on any of a configured transmission mode, specific use case, numerology, and parameters of another system configuration, e.g., CSI-RS, etc. Additionally and/or alternatively, in absence of the condition triggering the implicit indication, an IE (which may be as small as a single bit) may be used to indicate dynamic selection of a second option over other options. The IE, for example, may be used to indicate dynamic selection of frequency selective (mid-range PRG size) and wideband (large PRG size) precoding. Table 8 below lists an example set of values for implicit and explicit determinations for different values of the IE.

TABLE 8

| | Implicit determination | Explicit determination | |
| --- | --- | --- | --- |
| RBG | PRG (Small) | IE = 1 PRG (Mid-size) | IE = 0 PRG (Large size) |
| 2 | 1 | 1 | 2 |
| 4 | 1 | 2 | 4 |
| 8 | 1 | 4 | 8 |
| 16 | 1 | 4 | 16 |

In an embodiment, for every RBG size, a wireless transmit/receiving device (e.g., gNB and/or WTRU) may be configured with a default PRG size. The IE may be configured and/or used to indicate a switch between the small PRG size and the default PRG size (e.g., using a default value defined by the PRG). The default PRG size may be based on a (e.g., fixed) relationship to, or function of, any of the RBG size, scheduled bandwidth, another system configuration parameter, and an arbitrary configured value. The small PRG size value may be a fixed size, for instance. Alternatively, the small PRG size value may be configured (e.g., semi-statically) to take any of the {1, 2} PRB's. Table 9 below lists example values for default and small PRG sizes based on example RBG and IE values.

TABLE 9

| | Explicit determination | |
| --- | --- | --- |
| RBG | IE = 1 PRG (Small PRG size) | IE = 0 PRG (Default PRG size) |
| 2 | 1 | 2 |
| 4 | 1 | 4 |
| 8 | 1 | 8 |
| 16 | 1 | 8 |

In an embodiment, for every RBG size, a wireless transmit/receiving device (e.g., gNB and/or WTRU) may be configured with a set of values for small, mid and large PRG sizes. Table 10 below lists example PRG sizes corresponding to each RBG in a system with an example RBG size set of {2, 4, 8, 16}.

TABLE 10

| RBG | PRG (Small) | PRG (Mid-size) | PRG (Large size) |
| --- | --- | --- | --- |
| 2 | 1 | 1 | 2 |
| 4 | 1 | 2 | 4 |
| 8 | 1 | 4 | 8 |
| 16 | 1 | 4 | 8 |

In an embodiment, the mid-size PRG value may be considered as the default PRG size (e.g., responsive to a particular RBG size configuration). Alternatively, and/or additionally, the default value may be defined based on an implicit rule (e.g., scheduled transmission, system bandwidth, DMRS configuration, etc.). Alternatively, and/or additionally, the default value may be defined based on a (e.g., direct) relationship to, and/or function of, the selected RBG size. Alternatively, and/or additionally, the default value may be arbitrarily configured.

In an embodiment, an IE, e.g., a DCI field, may be turned on and off (or otherwise set) to assist PRG size selection. For example, if after RBG size configuration the DCI bit field remains off, the PRG size remains as the default value (e.g., the mid-size PRG). Alternatively, if the DCI bit field is turned on, a state $b_0$ may indicate a change in the PRG size from the default value to a small PRG size, such as, e.g., 2 PRBs and/or a small PRG size that may be necessary for certain scenarios, such as MU-MIMO pairing. Alternatively, if the DCI bit field is on and the state is set to $b_1$, the PRG size may be switched to a large PRG size (e.g., to enable better channel estimation). In an embodiment, a turned off DCI bit field may indicate (e.g., may always indicate) to maintain a current PRG size.

In an embodiment, if the current PRG size is already set to the smallest PRG size, a turned-on DCI bit with state $b_0$ may indicate a switch (e.g., a switch back) to the default value. Alternatively, if the current PRG size is already set to the largest PRG size, a turned-on DCI bit with state $b_1$ may indicate a switch (e.g., a switch back) to the default value. In an embodiment, both of the above-mentioned approaches may be used for switching back to the default value. Alternatively, only one of the above approaches is used for switching back to the default value, and the other state is reserved.

In an embodiment, a wireless transmit/receiving device (e.g., gNB and/or WTRU) may determine an implicitly determinable PRG size based on any configured value and an appropriate rule (e.g., as noted supra). The configured value may be, may be based on, may be related to and/or may be a function of one or more parameters of various system configurations, for example.

In an embodiment, the configured value may be based on, may be related to and/or may be a function of a size of an active bandwidth part. As an example, the configured value may represent N contiguous PRBs of an active bandwidth part. The active bandwidth part may be, for example, a configured RBG and/or a subband.

In an embodiment, the implicitly determinable PRG size may be based on a fixed relation to the configured value. For example, where the configured value represents N contiguous PRBs of an active bandwidth part, the implicitly determinable PRG size may be determined using equation PRG=N×M PRBs, where M may be a fixed value, a configurable value and/or determined based on the size of the active bandwidth part. In an embodiment, M may be any number (e.g., any integer) greater than or equal to 1 (i.e., M≥1) that results in precoding of M subbands with a same precoder. In an embodiment, M may be any number (e.g., any integer) that satisfies the following equation (1/N)<M<1 and that results in (i) partitioning of a subband and (ii) precoding of each part with potentially a different precoder. In an embodiment, for a given N, the PRG size may be scaled based on a duration of a transmission. The duration may depend on whether any of multi-slot (slot aggregation), slot and non-slot are used. For example, for a multi-slot transmission, the PRG size may be scaled down to provide higher transmission diversity.

In an embodiment, the configured value and/or the appropriate rule may be, may be based on, may be related to and/or may be a function of a location or range of a set of PRBs ("PRB location") within a scheduled or other bandwidth. In an embodiment where (i) the scheduled or other bandwidth may be partitioned into several parts (e.g., segments) and (ii) each part may be associated with a respective configured value corresponding to a (pre-)configured PRG size, the appropriate rule may be to select the configured value ((pre-)configured PRG size) corresponding to a particular PRB location within such bandwidth. The wireless transmit/receiving device (e.g., gNB and/or WTRU) may determine the implicitly determinable PRG size using such rule, which may be implemented using a lookup table, such as Table 11 below. Table 11 lists example bandwidth parts of a scheduled or other bandwidth along with their respective configured values. The (pre-)configured PRG sizes of different parts may or may not be the same.

TABLE 11

| RB Location | Configured Value |
|---|---|
| $X_0 - X_1$ RBs | PRG size 1 |
| $X_1 + 1 - X_2$ RBs | PRG size 2 |
| ... | ... |
| $X_{(Last-1)} + 1 - X_{Last}$ RBs | PRG size K |

In an embodiment, the multiple configured values for each part (e.g., PRG size 1, PRG size 2, etc,) may be configured using any of L1, L2 and higher layer control signaling and/or channels, including, for example, DCI and/or RRC signaling. In an embodiment, one of the multiple configured values may be considered as the default PRG size. A wireless transmit/receiving device (e.g., gNB and/or WTRU) may be configured to one of the remaining PRG sizes semi-statically or dynamically using any of L1, L2 and higher layer control signaling and/or channels, including, for example, DCI and/or RRC signaling. Table 12 below lists two configured values for each bandwidth part, namely, configured value 1 and configured value 2. Each of the configured values 1 and 2 may correspond to a (pre-)configured PRG size. As listed in Table 12, the configured values 1 correspond to (e.g., preconfigured) default PRG sizes. The configured values 2 may be configured by RRC signaling or dynamically by content of a received IE.

TABLE 12

| RB Location | Configured Value 1 (Default PRG Size) | Configured Value 2 |
|---|---|---|
| $X_0 - X_1$ RBs | PRG size $1_1$ | PRG size $2_1$ |
| $X_1 + 1 - X_2$ RBs | PRG size $1_2$ | PRG size $2_2$ |
| ... | ... | ... |
| $X_{(Last-1)} + 1 - X_{Last}$ RBs | PRG size $1_K$ | PRG size $2_K$ |

A wireless transmit/receiving device (e.g., gNB and/or WTRU) may be configured with different levels of density of DMRS in frequency and time and/or a larger span in frequency than the actual resource allocation. In an embodiment, the configured value and/or the appropriate rule may be, may be based on, may be related to and/or may be a function of a DMRS configuration. For example, the appropriate rule may be to select one of multiple configured values ((pre-) configured PRG sizes) based on a density of configured DMRS in a frequency domain. A wireless transmit/receiving device (e.g., gNB and/or WTRU) may determine the implicitly determinable PRG size using such rule, which may be implemented using a lookup table, such as Table 13 below. The density of configured DMRS in the frequency domain may be based on the number of DMRS subcarriers per symbol. Table 13 lists example DMRS density configurations along with their respective configured values ((pre-)configured PRG sizes).

TABLE 13

| DMRS Density Configuration | PRG |
|---|---|
| Configuration 1a: 1 Symbol, Comb 2 + 2 Cyclic Shift | PRG size 1 |
| Configuration 2a: 1 Symbol, 2-FD-OCC | PRG size 2 |
| ... | ... |

In an embodiment, the appropriate rule may be to select one of multiple configured values ((pre-)configured PRG sizes) based on a density of configured DMRS in a time domain. A wireless transmit/receiving device (e.g., gNB and/or WTRU) may determine the implicitly determinable PRG size using such rule, which may be implemented using a lookup table, such as Table 14 below. The density of configured DMRS in the time domain may be based on the number of DMRS symbols per slot. Table 14 lists example DMRS density configurations along with their respective configured values ((pre-)configured PRG sizes).

TABLE 14

| DMRS Density Configuration | PRG |
|---|---|
| Configuration 1a: 1 Symbol, Comb 2 + 2 Cyclic Shift | PRG size 1 |
| Configuration 1b: 2 Symbols, 2 Cyclic Shift + 2-TD-OCC | PRG size 2 |
| ... | ... |

In an embodiment, a wireless transmit/receiving device (e.g., gNB and/or WTRU) may be configured with a DCI field that may be used for indicating PRG size of a scheduled PDSCH. This DCI field may be as small as a single bit. The DCI field may be any of the IEs provided herein supra and/or infra. The wireless transmit/receiving device may also be configured with one PRG candidate value or with multiple PRG candidate values. The PRG candidate value(s) may be configured using any of L1, L2 and higher layer control signaling and/or channels, including, for example, DCI and/or RRC signaling. The wireless transmit/receiving device may select one value from the one configured PRG candidate value or the multiple configured PRG candidate values based on (e.g., responsive to) the DCI field indicating (e.g., being set to) a first value (e.g., a "1"). If two configured PRG candidate values are used, the one value may be implicitly determined. The wireless transmit/receiving device may determine which of the two (or multiple) PRG candidate value to use based on one or more of following:

One or more candidate values may be used and the candidate values may include 2, 4, and scheduled bandwidth, wherein the candidate value may be referred to as PRG size. As an example, three candidate values may be used such as PRG size 1 ($PRG_1$), PRG size 2 ($PRG_2$), and PRG size 2 ($PRG_3$), where PRG size 1=2, PRG size 2=4, and PRG size 3=scheduled bandwidth.

One or more types of parameters (e.g., PRG parameters) may be used to determine the PRG size between (among) two (or multiple) candidate values. The PRG parameter types may include any of a scheduled bandwidth, RBG size, a subband size for CSI reporting, a PDCCH REG bundling size, a bandwidth size, a bandwidth part size, a BWP size and a DMRS configuration. The DMRS configuration may include any of a DMRS pattern, a DMRS density within a PRB and slot, an orthogonal multiplexing method (e.g., TD-OCC, FD-OCC), a number of orthogonal DMRS ports and a number of symbols used for DMRS.

The PRG parameter type may be determined based on the configured two (or multiple) PRG candidate values. For example, if a first set of PRG candidate values $\{PRG_1, PRG_2\}$ are configured for a DCI field indicating (e.g., set to) a first value (e.g., a "1"), a first PRG parameter type (e.g., DMRS configuration) may be used to determine the PRG size of the scheduled PDSCH. If a second set of PRG candidate values $\{PRG_1, PRG_3\}$ are configured for the DCI bit field indicating (e.g., set to) a first value (e.g., a "1"), a second PRG parameter type (e.g., RBG size) may be used to determine PRG size of the scheduled PDSCH between (among) two (or multiple) candidate values.

In an embodiment, if candidate values $\{PRG_1, PRG_2\}$ are configured, then
PRG size=$PRG_1$, if DM-RS density satisfies (e.g., is higher than) a threshold; and/or
PRG size=PRG2, if DM-RS density does not satisfy (e.g., is lower than) the threshold.

In an embodiment, if candidate values $\{PRG_1, PRG_2\}$ are configured, then
PRG size=$PRG_1$, if DM-RS density satisfies (or alternately does not satisfy) a first threshold; and/or
PRG size=$PRG_2$, if DM-RS density satisfies (or alternately does not satisfy) a second threshold.

In an embodiment, if candidate values $\{PRG_1, PRG_3\}$ are configured, then
PRG size=$PRG_1$, if scheduled bandwidth satisfies (e.g., is smaller than) a threshold (e.g., $N_{RB}$) and/or
PRG size=$PRG_3$, if scheduled bandwidth does not satisfy (e.g., is larger than) the threshold (e.g., Ni).B In an embodiment, if candidate values $\{PRG_1, PRG_3\}$ are configured, then
PRG size=$PRG_1$, if scheduled bandwidth satisfies (or alternately does not satisfy) a first threshold (e.g., $N_{RB}$) and/or
PRG size=$PRG_3$, if scheduled bandwidth satisfies (or alternately does not satisfy) a second threshold (e.g., $N_{RB}$)

In an embodiment, if candidate values $\{PRG_2, PRG_3\}$ are configured, then
PRG size=$PRG_2$, if RBG satisfies (e.g., is smaller than) a threshold (e.g., $N_{RBG}$); and/or
PRG size=$PRG_3$, if RBG does not satisfy (e.g., is larger than) the threshold (e.g., $N_{RBG}$)

In an embodiment, if candidate values $\{PRG_2, PRG_3\}$ are configured, then
PRG size=$PRG_2$, if RBG satisfies (or alternately does not satisfy) a first threshold (e.g., $N_{RBG}$); and/or
PRG size=$PRG_3$, if RBG satisfies (or alternately does not satisfy) a second threshold (e.g., $N_{RBG}$)

As an alternative, the wireless transmit/receiving device may select one of the configured PRG candidate values based on (e.g., responsive to) the DCI field indicating (e.g., being set to) a second value (e.g., a "0"). The DCI field may be toggled between indicating the first value and the second value so as may operate as an indication to switch from one of the configured PRG candidate values to another (with or without carrying out implicit selection differentiation).

An implicitly determinable PRG size may be determined in multiple stages. For example, if a DMRS density is higher (lower or otherwise satisfies) than a predefined or configured threshold, a first candidate value may be used. Otherwise, the PRG may be determined based on another PRG parameter type (e.g., RBG size, scheduled bandwidth, bandwidth part size, BWP size, etc.). If candidate values $\{PRG_1, PRG_2\}$ are configured and the DMRS density for a scheduled PDSCH satisfies (e.g., is higher than) a threshold, then candidate value, $PRG_1$, may be used as the PRG size. Otherwise (or alternatively), the PRG size may be determined based on RBG size. For example, if the RBG size satisfies (e.g., is larger than) a predefined threshold, then a first of the candidate values (e.g., $PRG_1$) may be used. If the RBG size does not satisfy (e.g., is smaller than) the predefined threshold, then a second of the candidate values may be used (e.g., $PRG_2$).

In an embodiment, if the scheduled bandwidth satisfies (e.g., is larger than) a first threshold, then a larger (or largest) candidate value within the configured candidate values may be used as the PRG size. If the DMRS density satisfies (e.g., is higher than) a second threshold, then a smaller (or smallest) candidate value within the configured candidate values may be used as PRG size. If the scheduled bandwidth does not satisfy (e.g., is smaller than) the first threshold and the DMRS density does not satisfy (e.g., is lower than) the second threshold, then the PRG size may be determined based on RBG size.

The PRG size may be determined based on priorities of PRG parameter types. One or more PRG parameter types may be used to determine PRG size and the PRG parameter types may have priorities to determine the PRG size. For example, DMRS density may be considered as a highest priority. If a condition is met for the DMRS density, then the PRG size may be determined based on the DMRS density. If the condition is not met, then the second priority PRG parameter type (e.g., scheduled bandwidth) may be used to determine the PRG size and so on. One or more following may apply as priority of the PRG parameter types:

Example 1: DMRS density (or configuration)>scheduled bandwidth>RBG size>BWP>subband size>PDCCH REG bundle size; and Example 2: scheduled bandwidth>DM-RS density (or configuration)>RBG size>subband size.

Figures 12, 14:
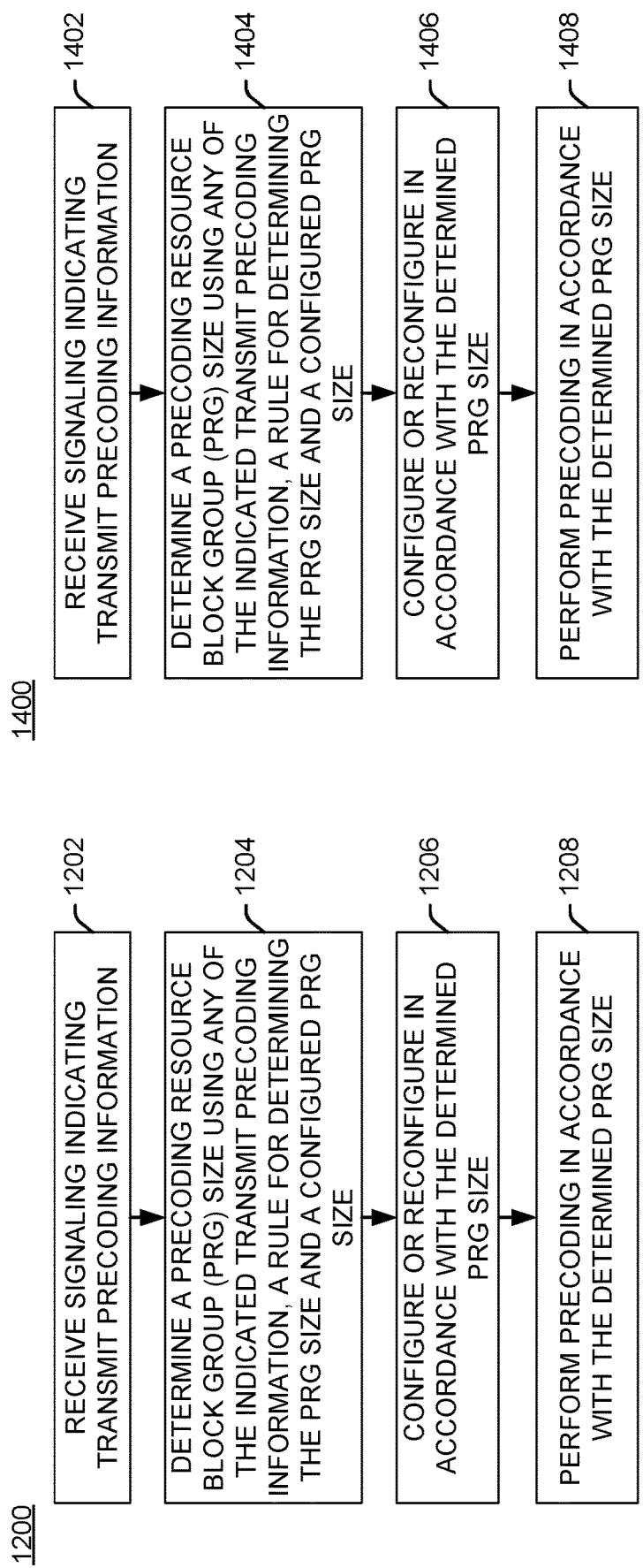
FIGS. 12-14 are flow charts illustrating representative procedures for use in connection with phase-continuous precoding.

FIG. 12 is a flow chart illustrating a representative procedure 1200 for use in connection with phase-continuous precoding. The representative procedure 1200 may be implemented in a first device, such as a base station (e.g., any of the base stations 114, eNode-Bs 160, gNBs 180 and base stations 202) or a WTRU (e.g., any of the WTRUs 102 and WTRUs 204). The representative procedure 1200 may be implemented in a device other than a base station and a WTRU as well.

To carry out the representative procedure 1200, the first device may communicatively couple with a second device. The second device may be a base station (e.g., any of the base stations 114, eNode-Bs 160, gNBs 180 and base stations 202) or a WTRU (e.g., any of the WTRUs 102 and WTRUs 204). In an embodiment, the second device may be a base station if the first device is a WTRU. Alternatively, the second device may be a WTRU if the first device is a base station.

As shown in FIG. 12, the first device may receive signaling indicating transmit precoding information (1202). The first device may determine a PRG size using any of the indicated transmit precoding information, a rule for determining the PRG size and a configured PRG size (1204). The first device may configure or reconfigure in accordance with the determined PRG size (1206). The first device may apply precoding in accordance with the determined PRG size (1208).

In an embodiment, the signaling indicating transmit precoding information may be signaled or otherwise provided on any of a dynamic and semi-static basis, and any of L1, L2 and higher layer control signaling and/or channels. In an embodiment, the signaling indicating transmit precoding information may be as small as a single bit. In an embodiment, the signaling indicating transmit precoding information may include information used for a purpose other than, or in addition to, transmit precoding, and wherein the transmit precoding information may be inferable from the information used for a purpose other than, or in addition to, transmit precoding. In an embodiment, the signaling indicating transmit precoding information may be or may include an IE. The IE may be any one or a combination of the IEs disclosed herein supra and/or infra. The IE may be as small as a single bit.

The rule may be provisioned into the first device using information signaled or otherwise provided on any of a dynamic and semi-static basis, and any of L1, L2 and higher layer control signaling and/or channels. The rule may be any of the rules disclosed herein supra and/or infra and/or include any of the information included in such rules. For example, as disclosed supra, the rule may include information for determining the PRG size from a configured RBG size. The RBG size may be signaled or otherwise provided on any of a dynamic and semi-static basis, and any of L1, L2 and higher layer control signaling and/or channels. As another example, the rule may include information for determining the PRG size from a size of one or more contiguous parts of the scheduled transmission, as disclosed supra.

In an embodiment, the IE may be (e.g., set to) one value to indicate to use the predefined PRG size, and may be (e.g., set to) another value to a signal to use an alternate rule to determine the PRG size. If the IE is more than one bit, then IE may be (e.g., set to) one of multiple different values to signal to use a respective one of multiple alternative rules to determine the PRG size. In an embodiment, absence of the IE or absence of the signaled information without the IE may operate as a (e.g., implicit) signal to use an alternate rule, or to use one or more of multiple alternative rules, for determining the PRG size.

In an embodiment, the first device may carry out the functions (1202)-(1216) on condition that it is configured for dynamic PRG size configuration. Alternatively, the first device might not carry out one or more of the functions (1202)-(1216) on condition that it is not configured for dynamic PRG size configuration. A signaled IE for turning on or off the dynamic PRG size configuration may be used to configure the first device.

Figure 13:
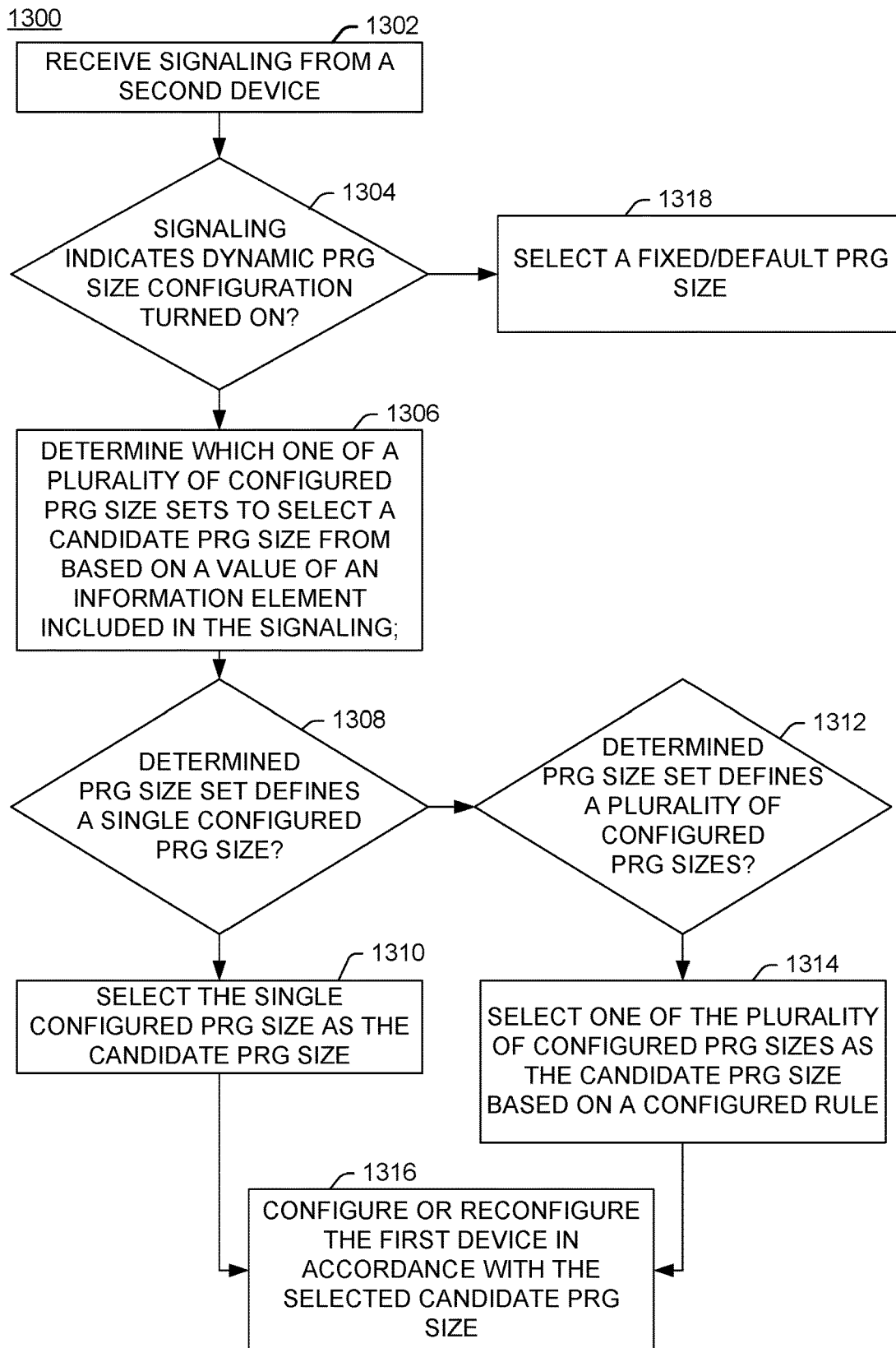

FIG. 13 is a flow chart illustrating a representative procedure 1300 for use in connection with phase-continuous precoding. The representative procedure 1300 may be implemented in a first device, such as a base station (e.g., any of the base stations 114, eNode-Bs 160, gNBs 180 and base stations 202) or a WTRU (e.g., any of the WTRUs 102 and WTRUs 204). The representative procedure 1300 may be implemented in a device other than a base station and a WTRU as well.

To carry out the representative procedure 1300, the first device may communicatively couple with a second device. The second device may be a base station (e.g., any of the base stations 114, eNode-Bs 160, gNBs 180 and base stations 202) or a WTRU (e.g., any of the WTRUs 102 and WTRUs 204). In an embodiment, the second device may be a base station if the first device is a WTRU. Alternatively, the second device may be a WTRU if the first device is a base station.

The representative procedure 1300 may be considered an embodiment of the representative procedure 1200 (FIG. 12). As shown in FIG. 13, the first device may receive signaling from the second device (1302). The first device may determine whether the signaling indicates that dynamic PRG size configuration is turned on or off (1304). On condition that the signaling indicates that dynamic PRG size configuration is turned on, the first device may determine which one of a plurality of configured PRG size sets to select a candidate PRG size from based on a value of an IE included in the signaling (1306). The first device may determine whether the determined PRG size set defines a single configured PRG size (1308). On condition that the determined PRG size set defines a single configured PRG size, the first device may select the single configured PRG size as the candidate PRG size (1310). The first device may determine whether the determined PRG size set defines a plurality of configured PRG sizes (1312). On condition that the determined PRG size set defines a plurality of configured PRG sizes, the first device may select one of the plurality of configured PRG sizes as the candidate PRG size based on a configured rule (1314). The first device may configure or reconfigure in accordance with the selected candidate PRG size (1316). If the first device determined that the signaling indicates that the dynamic PRG size configuration is turned on (1302), the first device may select any of a fixed and a default PRG size (1318).

The first device may receive signaling including an IE for configuring the dynamic PRG size configuration (not shown), The first device may configure for dynamic PRG size configuration in accordance with such IE (not shown).

In an embodiment, the IE may be as small as a single bit. The IE may be a PRG size indicator or like type IE and may be standardized.

In an embodiment, the configured rule may be any rule disclosed herein supra or infra. In an embodiment, the configured rule may explicitly specify which one of the plurality of configured PRG sizes to select. In an embodiment, the configured rule may specify one or more criteria for implicitly determining which one of the plurality of configured PRG sizes to select.

In an embodiment, the plurality of configured PRG sizes may include first and second PRG size options, and the configured rule may specify which one of the first and second PRG size options to select based at least in part on a RBG size. Alternatively, the configured rule may specify which one of the first and second PRG size options to select based at least in part on a RBG size and any of explicit and implicit assistance information. In an embodiment, the configured rule may specify which one of the plurality of configured PRG sizes to select based at least in part on a RBG size and a prior configured PRG size. In an embodiment, the RBG size may be signaled or otherwise provided on any of a dynamic and semi-static basis, and any of L1, L2 and higher layer control signaling and/or channels.

In an embodiment, the configured rule may specify which one of the plurality of configured PRG sizes to select based at least in part on a particular number of contiguous scheduled resource blocks. The particular number of contiguous scheduled resource blocks may be, for example, a minimum number of contiguous scheduled resource blocks.

In an embodiment, the configured rule may specify which one of the plurality of configured PRG sizes to select based on any configured value. In an embodiment, the configured value may be based on, related to and/or a function of a size of an active bandwidth part. The active bandwidth part may be any of a configured RBG and a subband.

In an embodiment, the configured rule may specify which one of the plurality of configured PRG sizes to select based on a fixed relation to a configured value. The configured value may represent N contiguous physical PRBs of an active bandwidth part, and the fixed relationship may be defined as equation PRG=N×M PRBs, where M is a fixed value, a configurable value or determined based on the size of the active bandwidth part. M may be any number greater than or equal to 1 (i.e., M≥1) that results in precoding of M subbands with a same precoder. Alternatively, M may be any number that satisfies equation (1/N)<M<1 and that results in (i) partitioning of a subband and (ii) precoding of each part with potentially a different precoder. In an embodiment, for a given N, the PRG size may be scaled based on a duration of a transmission.

In an embodiment, the configured value may be based on a PRB location within a bandwidth. In an embodiment, the configured rule may specify which one of the plurality of configured PRG sizes to select based on a PRB location within a bandwidth. In an embodiment, the PRB location may be associated with the one configured PRG size.

In an embodiment, the configured value may be based on a DMRS configuration. In an embodiment, the configured rule may specify which one of the plurality of configured PRG sizes to select based on a DMRS configuration. For example, the configured rule may specify which one of the plurality of configured PRG sizes to select based on a density of configured DMRS in any of a frequency domain and a time domain.

In an embodiment, the plurality of configured PRG sizes may include first and second PRG size options, and the configured rule may specify selecting the first PRG size option based at least in part on a preference of the first PRG size option over and the second PRG size option.

In an embodiment, the configured value may include a parameter of a system configuration. In an embodiment, the configured value may include an arbitrary value.

In an embodiment, the plurality of configured PRG sizes may include a first PRG size option, and the rule may specify selecting the first PRG size option on condition that a configured state change indicates changing from a current PRG size to the first PRG size option.

In an embodiment, a first wireless transmit/receiving device (e.g., gNB and/or WTRU) may determine the PRG size for frequency selective precoding based on a received feedback. The first wireless transmit/receiving device may perform channel measurements based on a (e.g., configured) periodic or aperiodic reference signal transmission, e.g., CSI-RS, SRS and/or other type of reference signal. The first wireless transmit/receiving device may estimate frequency selectivity of the channel based on the measurements. The estimate may be based on full channel response or on a sparse measurement. The first wireless transmit/receiving device may determine a degree of selectivity based on the estimate of the frequency selectivity of the channel. The first wireless transmit/receiving device may send an IE to a second wireless transmit/receiving device (e.g., WTRU and/or a gNB) to indicate (the estimate of) the frequency selectivity of the channel. The definition of the IE in relation to the estimate of the frequency selectivity of the channel may be listed in a table and configured by the gNB and/or other network element (e.g., semi-statically). The IE may be, for example, n bits representing $2^n$ different RBG sizes. The index in the table may correspond to different PRG size values per bandwidth part, service, numerology, etc.

The second wireless transmit/receiving device may detect the IE. The second wireless transmit/receiving device may select the indicated PRG size for precoding. The second wireless transmit/receiving device may transmit a transmission precoded in accordance with the indicated PRG size for precoding. The first wireless transmit/receiving device may receive, from the second wireless transmit/receiving device, the transmission precoded in accordance with the indicated PRG size for precoding.

For UL transmission, if gNB has determined the WTRU capability for per-tone precoding, it may trigger WTRU per-tone precoding by assigning a specific range of RBG sizes. As such, the WTRU may detect activation of per-tone UL precoding if it determines the size of the scheduled RBs is selected from a pre-defined set of RBG sizes.

The use (or not) of phase-continuous precoding may be signaled by the control channel. The control channel may use its own separate reference signals and precoders and the information may be decoded and used to estimate the channel for the data channel.

In the case of a common RS for the control channel and the data channel, the receiver may decode the control channel and on discovering that the data channel is phase-continuously precoded, the receiver may implement channel estimation smoothing to improve the performance of the data channel decoding procedure.

In an embodiment, the receiver may blindly estimate if the precoders for the data channel are phase-continuous. The receiver may first decode the data assuming phase-continuous precoding, and on failure, then decode the data assuming no phase-continuous precoding. Note that blind estimation may be used for the first few transmissions because after determining that the precoders are phase-continuous, it may be assumed that the precoders are likely stay that way.

Representative TPMI Mechanisms for Frequency Selective Precoding

In an uplink transmission with codebook-based frequency selective precoding, one or more TPMI(s) to be used by a WTRU for an uplink transmission and/or indications thereof may be provided by a gNB. The TPMI indications may be signaled or otherwise provided (collectively "signaled") on any of a dynamic and semi-static basis, and any of L1, L2 and higher layer control signaling and/or channels, may be used.

In a codebook-based precoding, entries of the codebook may be addressed by (e.g., obtainable using) a TPMI. The size and/or the number of bits used for each TPMI may correspond to the size of the codebook. As an example, for each entry in the codebook to be uniquely addressable by a TPMI, the size and/or the number of bits used for each TPMI depends on the number of entries in (size of) the codebook.

In an embodiment, a codebook may be defined for all or multiple WTRUs. Each WTRU may be directed to use (e.g., only use) a subset of the codebook according to its transmission capability. The TPMI size may be adjusted according to WTRU transmission capability. A codebook subset restriction (CBSR) may be based on different operational requirements. For example, the CBSR may be realized for different purposes, such as: reducing inter-cell interference and/or intra-cell interference, assisting MU pairing, WTRU mobility, WTRU transmission capability, etc. For example, in NR, three forms of uplink transmission in form of WTRU capabilities are currently considered, namely, full coherence, non-coherence and partial coherence.

Under full coherence, all ports corresponding to ports in an SRS resource can be transmitted coherently. Under non-coherence, all ports corresponding to ports in an SRS resource are not transmitted coherently. Under partial coherence, ports pairs corresponding to ports in an SRS resource can be transmitted coherently. For each mode of WTRU capability only a subset of the codebook may be required. As such, the TPMI size may be adjusted to match the multiplicity of the subset, and avoid using extra overhead for TPMI indication.

Table 15 below represents an example of a codebook for supporting 4Tx rank 1 transmission.

mission capability. Upon WTRU declaration of a certain coherence capability, both a gNB and the WTRU may determine the TPMI size solely based on the declaration. As such, each coherence capability case may (e.g. directly) indicate the CBSR, such as shown in Table 17 below.

TABLE 15

| Codebook index | Number of layers v = 1 |
|---|---|
| 0-7 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\-j\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 8-15 | $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 16-23 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |
| 24-27 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ — — — — |

A TPMI having a size of (at least) 5 bits may be used to address all entries of the table. However, not all the entries of the codebook may be needed for a given WTRU capability. For example, for a WTRU with only non-coherence transmission capability, a TPMI with a size of 2 bits may be used to address any of the 24-27 entries. Table 16 below includes an example of coverage of the codebook by employed TPMI for each case of coherence capability.

TABLE 16

| Coherence capability | Codewords | Bits |
|---|---|---|
| Fully coherent | 0-27 | 5 |
| Partially coherent | 16-27 | 4 |
| Non-coherent | 24-27 | 2 |

In an embodiment, if a WTRU is configured, the TPMI size may be solely determined by WTRU coherence trans-

TABLE 17

| Coherence capability | Codewords | Bits | TPMI content |
|---|---|---|---|
| Fully coherent | 0-27 | 5 | 0-27 |
| Partially coherent | 16-27 | 4 | 0-15 |
| Non-coherent | 24-27 | 2 | 0-3 |

In an embodiment, the indices of a TPMI may be reordered to match the TPMI content, such as set forth in Table 18 below. Unlike Table 16, Table 18 does not include entries 12-15

TABLE 18

| Codebook inde | Number of layers v = 1 |
|---|---|
| 24-31 | $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ |
| 16-23 | $\frac{1}{2}\begin{bmatrix}1\\-1\\1\\1\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ |
| 4-11 | $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ |

TABLE 18-continued

| Codebook index | Number of layers v = 1 | | | | | | | |
|---|---|---|---|---|---|---|---|---|
| 0-3 | $\frac{1}{2}\begin{bmatrix}1\\0\\0\\0\end{bmatrix}$ | $\frac{1}{2}\begin{bmatrix}0\\1\\0\\0\end{bmatrix}$ | $\frac{1}{2}\begin{bmatrix}0\\0\\1\\0\end{bmatrix}$ | $\frac{1}{2}\begin{bmatrix}0\\0\\0\\1\end{bmatrix}$ | — | — | — | — |

TABLE 19

| Coherence capability | Codewords | Bits | TPMI content |
|---|---|---|---|
| Fully coherent | 0-31 | 5 | 0-31 |
| Partially coherent | 0-11 | 4 | 0-11 |
| Non-coherent | 0-3 | 2 | 0-3 |

In an embodiment, following a WTRU declaration of coherence transmission capability, a relevant CBSR may be indicated to the WTRU dynamically or semi-statically. In case of a dynamic indication, the indicated CBSR may expire (or may be expired) after a certain number of transmissions, slot numbers or upon expiry of a timer. Alternatively, the dynamically indicated CBSR may be indicated as part of an uplink SPS configuration (sps-ConfigUL), and may be applied upon SPS activation.

The codebook entries corresponding to each coherence transmission capability listed in Table 20 may be related to WTRU coherence transmission capability as shown. In an embodiment, the TPMI size may be jointly determined by WTRU coherence transmission capability and gNB instructions (e.g., based on the entries in Table 20).

TABLE 20

| | Codebook index | Number of layers $\upsilon$ = 1 | | |
|---|---|---|---|---|
| Configuration 1 | 0-15 | Full Coherent | — | — |
| Configuration 2 | 16-23 | Full Coherent | Partial Coherence | — |
| Configuration 3 | 24-27 | Full Coherent | Partial Coherence | Non Coherence |

In an embodiment, upon declaration of WTRU coherence capability, a gNB may configure the WTRU for a desired CBSR by using a bit-map that matches the multiplicity of subsets required for each WTRU coherence capability. A 3-bit bit-map may be used for full coherence. A 2-bit bit-map may be used for partial coherence. And no bit map may be used for non-coherence. Other bit maps may be used as well.

In addition (or as an alternative) to WTRU coherence capability, the bit-map may reflect other considerations for defining the CBSR. For example, as shown in Table 21 below, the indices 0-15 may be split in two different configurations, in case a gNB may prefer to only use a subset of 0-15 precoders. Similarly, the bit-map length may be determined according to the required support for WTRU transmission coherency.

TABLE 21

| | Codebook index | Number of layers $\upsilon$ = 1 | | |
|---|---|---|---|---|
| Configuration 1 | 0-7 | Full Coherent | — | — |
| Configuration 2 | 8-15 | Full Coherent | — | — |

TABLE 21-continued

| | Codebook index | Number of layers $\upsilon$ = 1 | | |
|---|---|---|---|---|
| Configuration 3 | 16-23 | Full Coherent | Partial Coherence | — |
| Configuration 4 | 24-27 | Full Coherent | Partial Coherence | Non Coherence |

The WTRU configuration of the bit-map may be done through RRC signaling or dynamically. In case of a dynamic indication, the indicated CBSR may expire (may be expired) after a certain number of transmissions, slot numbers or upon expiry of a timer. Alternatively, the dynamically indicated CBSR may be indicated as part of an uplink SPS configuration (sps-ConfigUL), and may be applied upon SPS activation.

FIG. 14 is a flow chart illustrating a representative procedure 1400 for use in connection with (e.g., UL or DL) codebook based transmission configuration. The representative procedure 1400 may be implemented in a first device, such as a base station (e.g., any of the base stations 114, eNode-Bs 160, gNBs 180 and base stations 202) or a WTRU (e.g., any of the WTRUs 102 and WTRUs 204). The representative procedure 1400 may be implemented in a device other than a base station and a WTRU as well.

To carry out the representative procedure 1400, the first device may communicatively couple with a second device. The second device may be a base station (e.g., any of the base stations 114, eNode-Bs 160, gNBs 180 and base stations 202) or a WTRU (e.g., any of the WTRUs 102 and WTRUs 204). In an embodiment, the second device may be a base station if the first device is a WTRU. Alternatively, the second device may be a WTRU if the first device is a base station.

As shown in FIG. 14, the first device may transmit, to the second device, a report reporting a transmission coherence capability of the first device (1402). The first device may receive, from the second device, a CBSR commensurate with the reported transmission coherence capability (1404). The first device may determine a TPMI size based on the CBSR (1406). The first device may receive a TPMI, e.g., from the second device (1408). The first device may detect and/or decode the TPMI based on the determined TPMI size (1410). The first device may determine codebook subsets based on the received TPMI and the CBSR (not shown).

In an embodiment, the CBSR may be a higher layer parameter. In an embodiment, the reported transmission coherence capability may be any of a fully coherent capability, a partially coherent capability and a non-coherent capability.

In an embodiment, the first device may reorder the indices of the TPMI based on the CBSR. In an embodiment, the first device may receive higher layer signaling including a bit map for configuring the WTRU with the CBSR, and may use the bit map to configure the itself with the CBSR.

Figure 15:
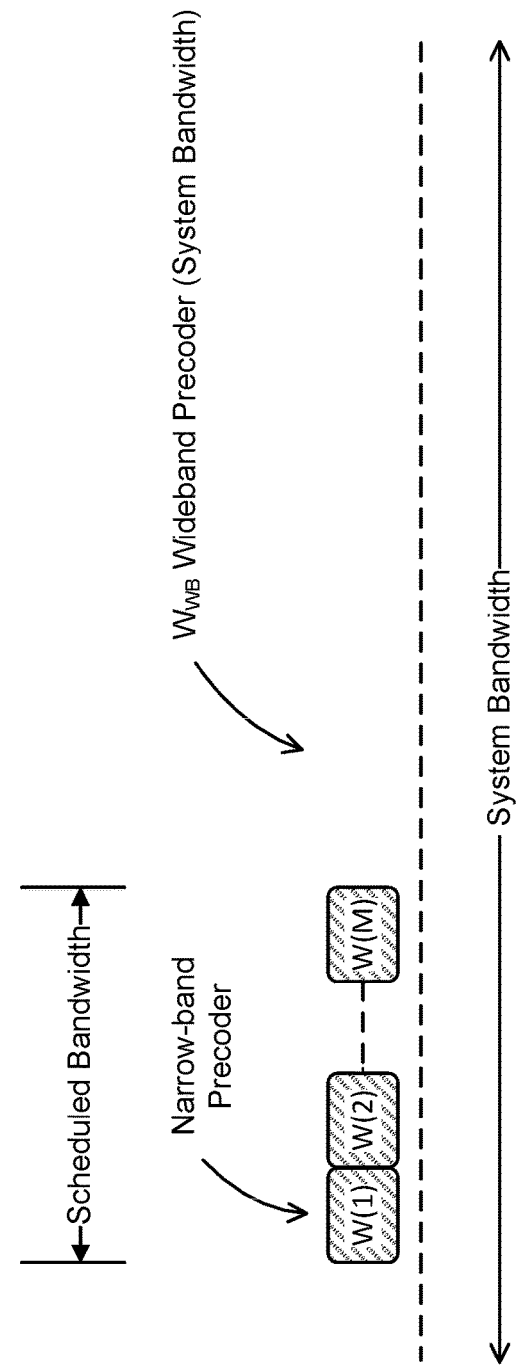
FIG. 15 is a block diagram illustrating example frequency selective precoding for multiple subband transmission.

FIG. 15 is a block diagram illustrating example frequency selective precoding for transmission on multiple (a plurality of) subbands transmission. As shown, the frequency selective uplink precoding may be for M (e.g., localized or distributed) subbands. Each subband of the M subbands may define a bandwidth corresponding to frequency resources (collective subcarriers) of one or more RBs. The M subbands, collectively, may define a scheduled bandwidth for the WTRU.

M narrow-band precoders, {W(1), W(2), . . . , W(M)} corresponding to the M subbands, respectively, may be signaled implicitly or explicitly to the WTRU for use in connection with a (e.g., likewise signaled) resource allocation considered for the uplink transmission. The precoding W may represent a single or a dual stage precoding mechanism. The subband precoding W may correspond to the second beamforming matrix $W_2$ if a dual-stage codebook is supported.

In case of a configuration with a plurality of SRS ports to be used by a WTRU for an uplink transmission, SRIs may be provided by a gNB. The SRIs may be used to associate TPMIs with the SRS ports. A single SRI may be used to associate a TPMI with one of the SRS ports or more than one (e, g., a group) of the SRS ports. In which case, the number of SRIs indicated by the gNB may be equal to, or less than, the number of TPMIs indicated by the gNB. In an embodiment, only some of the SRIs indicated by the gNB are used to associate TPMIs with the SRS ports.

Representative Examples of Supplementary TPMI and SRI Mechanisms for Frequency Selective Precoding For simplicity of exposition herein supra and infra, the disclosure and various disclosed embodiments are described, for the most part, in connection with TPMIs and/or indications thereof. Those skilled in the art will recognize that some or all of the disclosure and various disclosed embodiments described in connection with TPMIs and/or indications thereof are (e.g., equally) applicable to SRIs.

Like a TPMI, a SRI may define a set of indices. The set of indices defined by a SRI may include a first index corresponding to (e.g., identifying or indicative of) one or more SRS ports and a second index corresponding to (e.g., identifying or indicative of) a precoding matrix associated with such SRS ports. Given that an SRI and a TPMI may have or one-to-one or a many-to-one relationship, an SRI may have a length defined in accordance with a corresponding number of configured SRS ports, and that number may be equal or less than the number of TPMIs indicated by the gNB. Those skilled in the art will recognize that some or all of the disclosure and various disclosed embodiments described in connection with TPMIs and/or indications thereof may be modified accordingly for SRIs.

Assuming single stage precoding, the signaled TPMIs may include narrow-band and wide-band components. The wide-band component may be based on a bandwidth equal or larger than the scheduled transmission. For example, in FIG. 15, {W(1), W(2), . . . , W(M)} may be narrow-band precoders, and $W_{WB}$ may be a wide-band precoder (e.g., for any of the system bandwidth, available system bandwidth and an entire bandwidth a UE may support as a capability). The information about the wide-band precoder may be signaled at a same rate or a different rate as (e.g., more/less frequently than) the narrow-band precoders. As an example of the different indication rate, the information regarding the narrow-band precoders may be signaled in each UL grant, and the information regarding the wide-band precoder may be signaled less frequently, such as in a one every few UL grants or a subset of a set of UL grants. Alternatively, the information regarding the wide-band precoders may be signaled in each UL grant, and the information regarding the narrow-band precoders may be signaled less frequently, such as in a one every few UL grants or a subset of a set of UL grants. The terms "narrow-band precoder" and the terms "sub-band precoder" may be used herein interchangeably.

Figure 16:
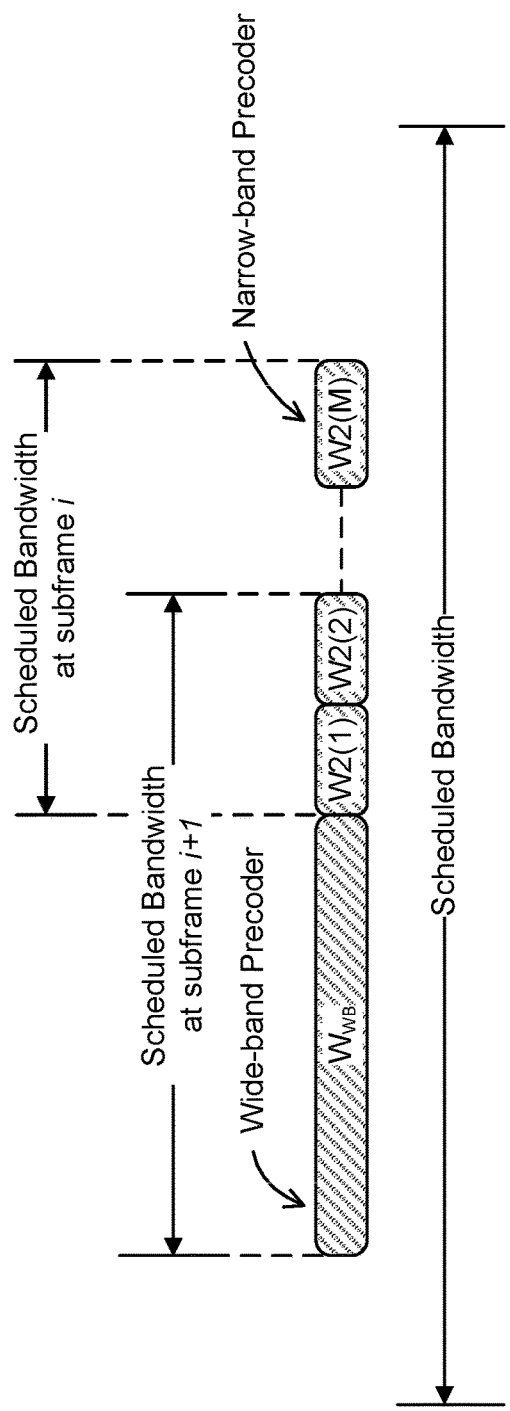
FIG. 16 is a block diagram illustrating example frequency selective precoding for localized scheduling with various bandwidth components.

A WTRU may decode the received narrow-band and wide-band indications at their corresponding rates. In case of a change in resource re-scheduling, a WTRU may use an available wide-band precoder for the newly allocated resources until being informed of a change/update to W1. As an example and with reference to FIG. 16, an uplink resource allocation for subframe (i+1) may be different from an uplink resource allocation in subframe i. For transmission in subframe (i+1) where the uplink resource allocation includes resources at one or more allocated subbands not used for subframe i ("newly allocated subbands"), the WTRU may use the $W_{WB}$ for precoding of the resources at such newly allocated subbands. For distributed resource allocations, the WTRU may use the $W_{WB}$ for precoding of resources at newly allocated subbands within an earlier scheduled bandwidth.

A WTRU may receive a wide-band TPMI via a higher layer signaling (e.g., MAC-CE or RRC) and narrow-band TPMIs in an uplink grant. The wide-band TPMI may remain valid until it is updated or it may expire after a period of time (e.g., responsive to a timeout of a timer). Alternatively, the wide-band TPMI may be refreshed after a period of time (e.g., to prevent its expiration).

A WTRU may receive a wide-band TPMI in an (e.g., each) uplink grant encoded with an RNTI. For example, one or more C-RNTIs may be allocated to a WTRU and one of the C-RNTIs may be determined or selected to scramble CRC of an uplink grant DCI to indicate the wideband TPMI, and the subband TPMIs may be indicated in the DCI.

In embodiment, the precoding information may be split into narrow-band and mid-band WMB precoder components. A mid-band component may correspond to a bandwidth that is wider than a bandwidth corresponding to a narrow-band component and narrower than the system bandwidth. The span of bandwidths of corresponding mid-band components may be as wide as the entire system bandwidth or less. The entire (e.g., system/available) bandwidth may be divided in N (contiguous or non-contiguous) parts/segments, and N mid-band precoders {$W_{MB}(1)$, $W_{MB}(2)$ , . . . , $W_{MB}(N)$} may be signaled for precoding of their corresponding N parts/segments. The information about the mid-band precoders and the narrow-band precoders may be signaled at a same or a different rate.

Figure 17:
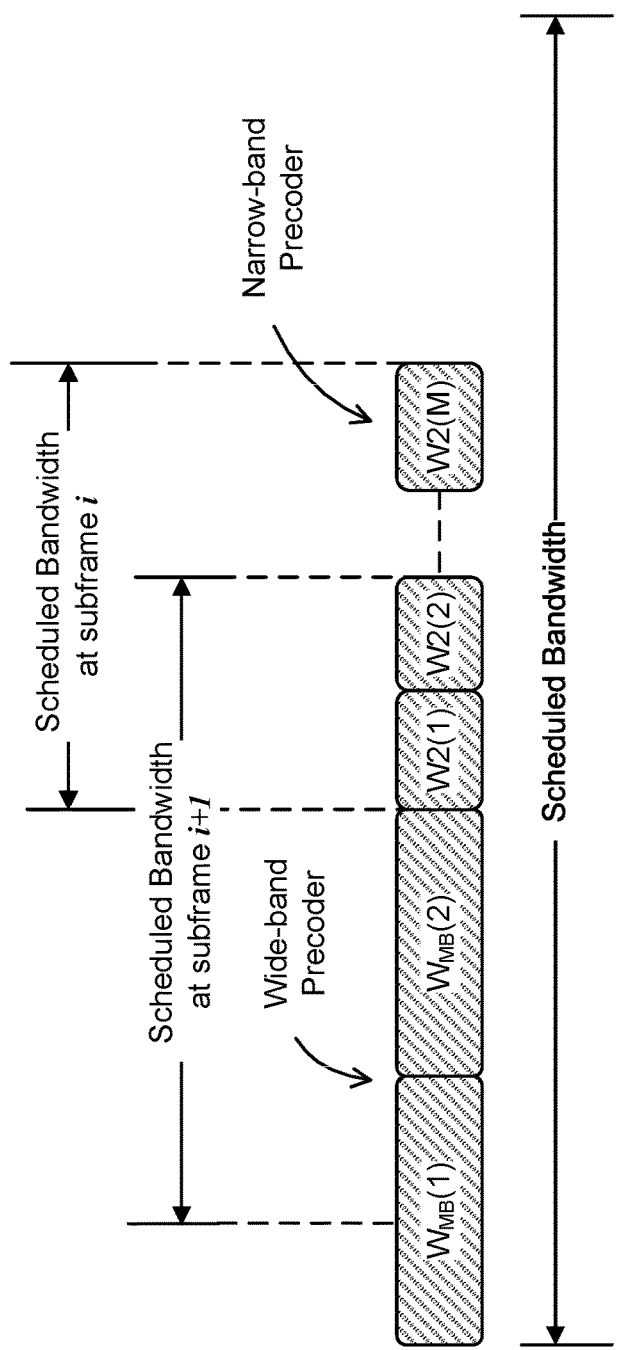
FIG. 17 is a block diagram illustrating example frequency selective precoding for localized scheduling with various bandwidth components.

A WTRU may decode the received narrow-band and mid-band indications at their corresponding rates. In case of a change in resource re-scheduling, a WTRU may use the available mid-band precoder for the newly allocated resources until being informed of a change/update to W1. As an example and with reference to FIG. 17, the entire (e.g., system and/or available) bandwidth may be segmented into 4 parts and an uplink resource allocation for subframe (i+1) may be different from an uplink resource allocation in subframe i. For transmission in subframe (i+1) where the uplink resource allocation includes resources at newly allocated subbands, the WTRU may employ a most relevant mid-band precoder, {$W_{MB}(1)$, $W_{MB}(2)$} for precoding of resources at the newly allocated subbands. For distributed resource allocations, the WTRU may use a $W_{WB}$ (not shown) for precoding of resources at newly allocated subbands within an earlier scheduled bandwidth.

In an embodiment, a wideband TPMI with one or more best-M subband TPMIs may be signaled in an associated uplink grant. For example, the best-M subband TPMIs may be used for subband precoding for the selected subbands and the wideband TPMI may be used for the rest of subbands within the scheduled bandwidth.

Information (e.g., a bit field) indicating a wideband TPMI and best-M TPMIs with its associated best-M subband index may be provided in an uplink grant. For example, if K subbands (e.g., K>M) are located in a scheduled bandwidth, the wideband TPMI may be used for the K subbands except for the those indicated as the best M subbands, and the subband TPMI(s) may be used for the corresponding subbands indicated as best-M subbands.

In an embodiment, the M value may be predetermined based on a system bandwidth. In an embodiment, the M value may be determined as a function of the scheduled bandwidth or the number of subbands within a scheduled bandwidth. In an embodiment, the M value may be fixed. In an embodiment, the M value may be configured via a higher layer signaling. In an embodiment, the M value may be '0' (for example, when DFT-s-OFDM is used for uplink waveform and/or there are no subband TPMIs in the uplink grant).

An indication of supplementary TPMI information might not be required in various instances. In an embodiment, transmission of supplementary TPMI indications may be activated and/or de-activated, e.g., on an as needed basis. In an embodiment, the transmission of supplementary TPMI indications may be initially deactivated and later activated. Alternatively, the transmission of supplementary TPMI indications may be initially activated and later de-activated. The activation and/or de-activation occur responsive to explicit signaling and/or messaging. The activation and/or de-activation occur responsive to a timer expiration, timeout or the like, implicit signaling and/or messaging, and/or other implicit method.

In an embodiment, a WTRU may be configured by higher layer signaling to activate/de-activate the transmission of the supplementary TPMI information. In an embodiment, a WTRU may determine a presence of the supplementary TPMI information dynamically by or based on the format of a received PDCCH. If, for example, the indicated TPMI vector does not match the size of the scheduled transmission, then the presence of the TPMI information may be indicated as part of the DCI payload. In an embodiment, a WTRU may detect a presence of the supplementary TPMI information by examining an IE (which may be as small as a single bit) in the DCI. The IE may indicate the presence of the supplementary TPMI information in a separate payload transmitted in L1 (PDSCH) or L2 (MAC CE).

Figure 18:
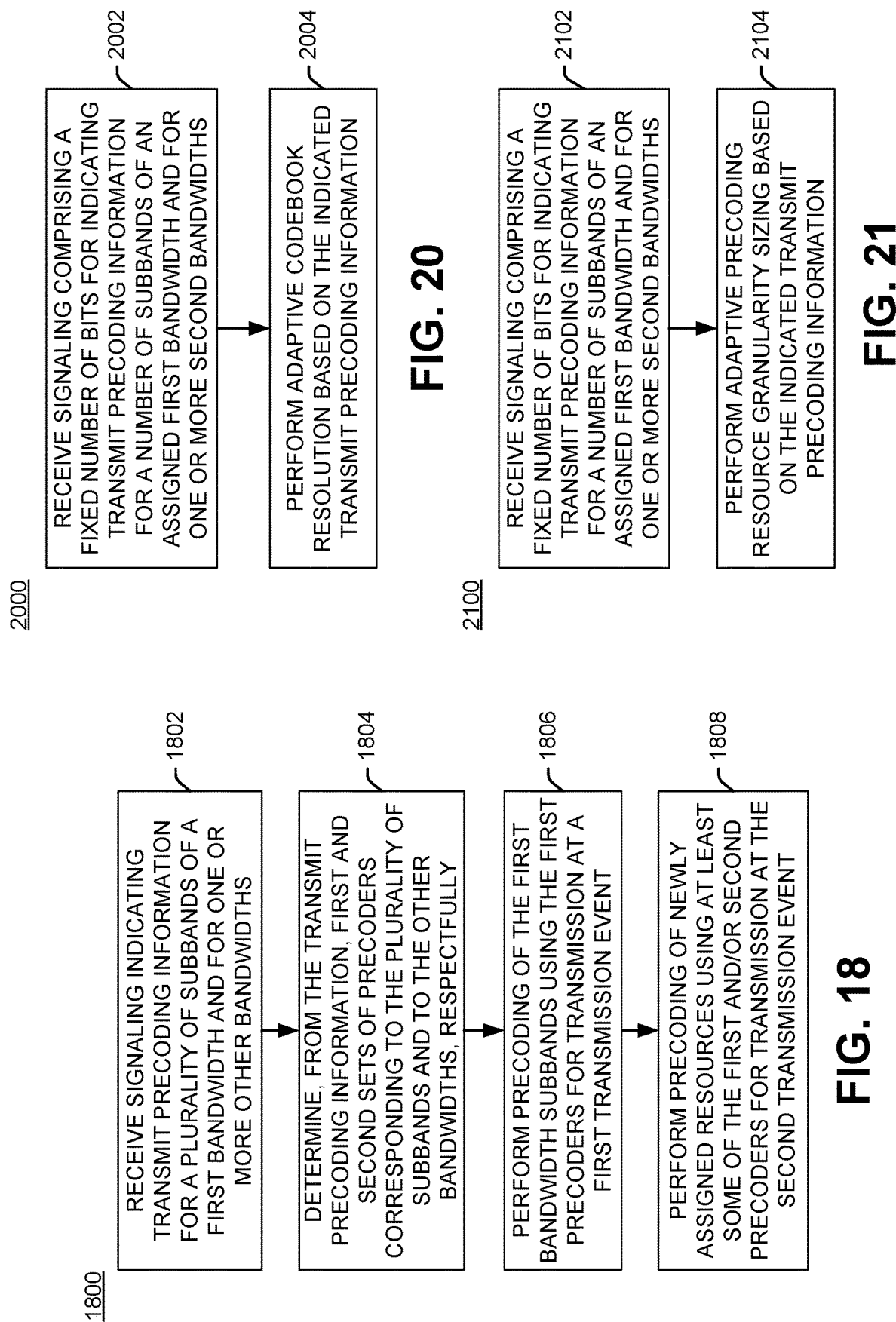
FIG. 18 is a flow chart illustrating a representative procedure for use in connection with phase-continuous precoding.

FIG. 18 is a flow chart illustrating a representative procedure 1800 for use in connection with phase-continuous precoding. The representative procedure 1800 may be implemented in a first device, such as a base station (e.g., any of the base stations 114, eNode-Bs 160, gNBs 180 and base stations 202) or a WTRU (e.g., any of the WTRUs 102 and WTRUs 204). The representative procedure 1800 may be implemented in a device other than a base station and a WTRU as well.

To carry out the representative procedure 1800, the first device may communicatively couple with a second device. The second device may be a base station (e.g., any of the base stations 114, eNode-Bs 160, gNBs 180 and base stations 202) or a WTRU (e.g., any of the WTRUs 102 and WTRUs 204). In an embodiment, the second device may be a base station if the first device is a WTRU. Alternatively, the second device may be a WTRU if the first device is a base station.

As shown in FIG. 18, the first device may receive signaling indicating transmit precoding information for a plurality of subbands of a first bandwidth and for one or more other bandwidths (1802). The first device may determine, from the transmit precoding information, first and second sets of precoders corresponding to the plurality of subbands of the first bandwidth and to the other bandwidths, respectfully (1804). The first device may perform precoding of the first bandwidth subbands using the first precoders for transmission at a first transmission event (1806). The first device may perform precoding of newly assigned resources using at least some of the first and/or second precoders for transmission at the second transmission event (1808). A benefit of carrying out representative procedure 1800 is that it reduces the number of bits used for signaling transmit precoding information in that no additional bits (or a reduced number of additional bits) are needed to signal transmit precoding information for the second transmission event.

In an embodiment, the transmit precoding information may include first and second TPMI indications. In an embodiment, the first TPMI indications may correspond to (e.g., respective) narrow-band precoder components. In an embodiment, the second TPMI indications may correspond to (e.g., respective) mid-band precoder components. In an embodiment, the second TPMI indications may correspond to (e.g., respective) wide-band precoder components. In an embodiment, the second TMPI may correspond to any of mid-band and wide-band precoder components. In an embodiment, the transmit precoding information may be as small as a single bit. In an embodiment, the transmit precoding information may be an IE.

Figure 19:
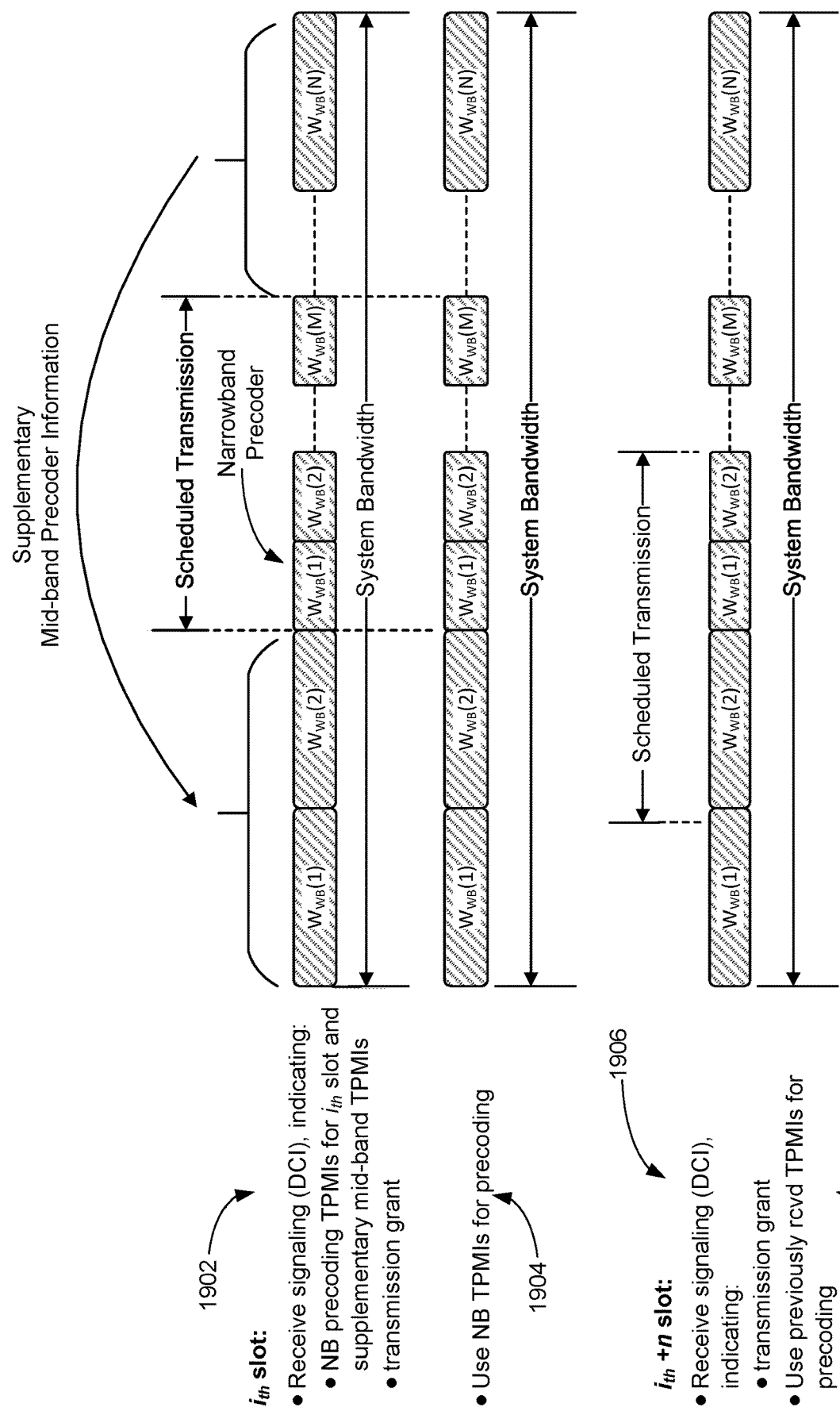
FIG. 19 illustrates an example transmit precoding matrix indices (TPMI) indication mechanism with supplementary mid-band TPMI information.

Referring now to FIG. 19, an example TPMI indication mechanism with supplementary mid-band TPMI information is shown. The example TPMI indication mechanism of FIG. 18 may be considered an embodiment of the representative procedure 1800 (FIG. 18).

As shown in FIG. 19, the first device may receive signaling (e.g., a DCI) indicating a first grant for transmission at an ith slot along with narrow band precoding TPMIs for the ith slot and supplementary mid-band precoding TPMIs (1902). The first device may use precoders corresponding to narrow band precoding TPMIs for the transmission at the ith slot (1904). The first device may receive signaling (e.g., a DCI) indicating a second grant for transmission at the ith+n slot (1906). The first device may use precoders corresponding to at least some of narrow band precoding TPMIs and/or mid-band precoding TPMIs for the transmission at the ith+n slot (1908). Like representative procedure 1700, a benefit of the TPMI indication mechanism with supplementary midband TPMI information of FIG. 19 is that it reduces the number of bits used for signaling transmit precoding information in that no additional bits (or a reduced number of additional bits) are needed to signal transmit precoding information for the transmission at the ith+n slot. Some additional bits may be used to signal transmit precoding information to provide TPMIs for any portion the scheduled transmission bandwidth not previously indicated and/or to update previously specified TPMIs.

Representative Adaptive Resolution TPMI Mechanisms for Frequency Selective Precoding For an uplink transmission, the TPMI indication may be signaled on any of a dynamic and semi-static basis, and any of L1, L2 and higher layer control signaling and/or channels, may be used. The capacity of the control channel for TPMI indication of M narrow-band precoders, {W(1), W(2), ..., W(M)} may often be assumed fixed. The precoding W may represent a single or a dual stage precoding mechanism. The subband precoding W may correspond to the second beamforming matrix $W_2$ if a dual-stage codebook is supported.

Representative Adaptive Codebook Resolution Examples

The number of bits used for TPMI(s) indication in an uplink grant (DCI) may be fixed (e.g., notwithstanding that the number of scheduled RBs and/or the number of subbands corresponding to the scheduled RBs may change from grant to grant). In such case, codebook subsampling may be used for one or more (e.g., each) subband. For example, the reference number of subbands may be defined, configured, or determined as a value, Nsub; if the number of subbands within the scheduled bandwidth is equal to or smaller than Nsub, all codewords in the codebook may be used for subband TPMI(s). If the number of subbands within the scheduled bandwidth is larger than Nsub, codebook subsampling may be used for subband TPMI(s), and the number of codewords in the codebook for subband TPMI(s) may be limited.

In an embodiment, the codebook subsampling may be referred to as a codebook subset restriction with reduced TPMI indication. In an embodiment, the codebook subsampling may be predefined or predetermined based on the number of subbands in a scheduled bandwidth and/or the Nsub. In one embodiment the Nsub may be predefined or fixed. In an embodiment, the Nsub may be configured via a higher layer signaling. If the number of subbands is smaller than the Nsub, codebook oversampling may be used. The oversampling may be based on an oversampling factor of the codebook generation. For example, an oversampled DFT matrix may be used for the codebook and a reference oversampling factor (e.g., O=4) may be used when the number of subband is the same as Nsub and a larger oversampling factor (e.g., O=8) may be used when the number of subband is smaller than Nsub.

Assuming a fixed capacity for the TPMI indication channel, in a solution, the size the employed codebook may be readjusted according to a change in size of the resource allocation. Therefore, the indicated TPMI indices may refer to the corresponding members of a down-sampled mother codebook.

In an embodiment, a WTRU may decode the received control payload, such as a DCI, and may determine therefrom a size of a resource allocation corresponding to a received UL grant. From the decoded size of the resource allocation, the WTRU may further decode of the received TPMI information to determine the TPMIs per subband, determine a sampling rate of the mother codebook, and/or select a precoder per subband based the decoded TPMI per subband and the down-sampled codebook. In case of a change in resource re-scheduling, the WTRU may adopt the codebook down-sampling process until being informed of a higher resolution for W1 update.

Table 22 lists example parameters and corresponding values for carrying out codebook down-sampling. In accordance with Table 22, the number of bits per TPMI may adjusted to support the 32 RB transmission with the same DCI size that was used in subframe i, for 16 RB transmission.

TABLE 22

|  | Subframe i | Subframe (i + 1) |
|---|---|---|
| Number of RBs scheduled | 16 | 32 |
| PRG size | 4 | 4 |
| Number of bits per TPMI | 4 | 2 |
| DCI size | 16 | 16 |
| Codebook size | 16 | 4 |

FIG. 20 is a flow chart illustrating a representative procedure 2000 for use in connection with phase-continuous precoding. The representative procedure 2000 may be implemented in a first device, such as a base station (e.g., any of the base stations 114, eNode-Bs 160, gNBs 180 and base stations 202) or a WTRU (e.g., any of the WTRUs 102 and WTRUs 204). The representative procedure 2000 may be implemented in a device other than a base station and a WTRU as well.

To carry out the representative procedure 2000, the first device may communicatively couple with a second device. The second device may be a base station (e.g., any of the base stations 114, eNode-Bs 160, gNBs 180 and base stations 202) or a WTRU (e.g., any of the WTRUs 102 and WTRUs 204). In an embodiment, the second device may be a base station if the first device is a WTRU. Alternatively, the second device may be a WTRU if the first device is a base station.

As shown in FIG. 20, the first device may receive, e.g., from the second device, signaling comprising a fixed number of bits for indicating transmit precoding information for (i) a number of subbands of a first bandwidth assigned to the first device, and (ii) one or more second bandwidths (2002). The first device may perform adaptive codebook resolution based on the indicated transmit precoding information (2004). Although not shown, the first device may (i) perform channel measurements based on a reference signal transmission; (ii) determine an estimate of frequency selectivity of the channel based on the measurements; (iii) determine a degree of selectivity based on the estimate of frequency selectivity; and/or (iv) send, to the second device, an IE indicating (the estimate of) the frequency selectivity of the channel.

In an embodiment, the first device may perform adaptive codebook resolution at least in part by carrying out codebook subsampling based on the number of subbands. In an embodiment, the first device may perform adaptive codebook resolution at least in part by carrying out codebook subsampling based on the number of subbands satisfying a threshold. The threshold may be or may be based on a reference number of subbands. In an embodiment, the first device may perform adaptive codebook resolution at least in part by carrying out codebook oversampling based on the number of subbands. In an embodiment, the first device may perform adaptive codebook resolution at least in part by carrying out codebook oversampling based on the number of subbands satisfying a threshold, wherein the threshold is or is based on a reference number of subbands.

Representative Adaptive PRG Sizing Examples

As noted above, the number of bits used for TPMI(s) indication in an uplink grant DCI may be fixed. It may be fixed notwithstanding that the number of RBs in the scheduled RBs may change from grant to grant. In such case, adaptive subband sizing may be used. Pursuant to adaptive subband sizing, the number of subbands may be limited to a certain number (e.g., Nsub) and the number of RBs for a subband (e.g., precoding resource granularity; PRG) may be determined based on the number RBs scheduled. For example, the maximum number of subbands may be limited to 4 (e.g., Nsub=4) if (i) the number PRBs allocated for an uplink transmission is 32, (ii) the subband size may be determined as 8 PRBs and 4 TPMIs may be provided in the uplink grant.

In an embodiment, the maximum number of subbands may be predefined or fixed. In an embodiment, the maximum number of subbands may be configured via a higher layer signaling. In an embodiment, the maximum number of subbands may be determined based on the downlink DCI which is matched with uplink grant DCI in terms of size. In an embodiment, the maximum number of subbands may be determined based on a system bandwidth or maximum supportable bandwidth by the WTRU.

Assuming a fixed capacity for the TPMI indication channel, in a solution, PRG size may be readjusted according to a change in size of the resource allocation. Therefore, the indicated TPMI indices may refer to the corresponding new PRG size definition.

In an embodiment, a WTRU may decode the received control payload, such as a DCI, to determine the size of a resource allocation corresponding to a received UL grant. From the decoded size of the resource allocation, a WTRU may further decode the received TPMI information to determine the TPMIs per subband and/or determine the PRG size. In case of a change in resource re-scheduling, the WTRU may adopt the new PRG size definition until being informed of a higher resolution for W1 update.

Table 23 lists example parameters and corresponding values for carrying out adaptive PRG sizing. In accordance with Table 23, the DCI size is assumed fixed, and the size of the PRG is adjusted to support the 32 RB transmission with the same DCI size that was used in subframe i, for 16 RB transmission.

TABLE 23

|  | Subframe i | Subframe (i + 1) |
| --- | --- | --- |
| Number of RBs | 16 | 32 |
| PRG size | 4 | 8 |
| Number of bits per TPMI | 4 | 4 |
| DCI size | 16 | 16 |
| Codebook size | 16 | 16 |

FIG. 21 is a flow chart illustrating a representative procedure 2100 for use in connection with phase-continuous precoding. The representative procedure 2100 may be implemented in a first device, such as a base station (e.g., any of the base stations 114, eNode-Bs 160, gNBs 180 and base stations 202) or a WTRU (e.g., any of the WTRUs 102 and WTRUs 204). The representative procedure 2100 may be implemented in a device other than a base station and a WTRU as well.

To carry out the representative procedure 2100, the first device may communicatively couple with a second device. The second device may be a base station (e.g., any of the base stations 114, eNode-Bs 160, gNBs 180 and base stations 202) or a WTRU (e.g., any of the WTRUs 102 and WTRUs 204). In an embodiment, the second device may be a base station if the first device is a WTRU. Alternatively, the second device may be a WTRU if the first device is a base station.

As shown in FIG. 21, the first device may receive, e.g., from the second device, signaling comprising a fixed number of bits for indicating transmit precoding information for (i) a number of subbands of a first bandwidth assigned to the first device, and (ii) one or more second bandwidths (2102). The first device may perform adaptive precoding resource granularity sizing based on the indicated transmit precoding information (2104). Although not shown, the first device may (i) perform channel measurements based on a reference signal transmission; (ii) determine an estimate of frequency selectivity of the channel based on the measurements; (iii) determine a degree of selectivity based on the estimate of frequency selectivity; and/or (iv) send, to the second device, an IE indicating (the estimate of) the frequency selectivity of the channel.

In an embodiment, the first device may perform adaptive precoding resource granularity sizing at least in part by determining and/or setting precoding resource granularity based on allocated resources and the fixed number of bits. In an embodiment, the first device may determine and/or sett the precoding resource granularity at least in part by determining whether to adjust or maintain the number of subbands based on allocated resources and the fixed number of bits.

Representative PMI Re-Use Examples

For a given bandwidth part, a WTRU may be configured to have a fixed number of TPMIs ($N_{TPMI}$) irrespective of the number of scheduled RBs for transmission. The $N_{TPMI}$ may be configured dynamically, semi-statically or may be determined based on a table in relation to the bandwidth part size. The overall number of bits used for TPMI(s) in an uplink grant DCI may be a fixed value. As such, upon configuration of the BWP, a WTRU may determine $N_{TPMI}$ to assist TPMI DCI detection. For a given bandwidth part, a WTRU may also be configured with a number of subbands for frequency selective precoding, ($N_{Subband}$).

Figure 22:
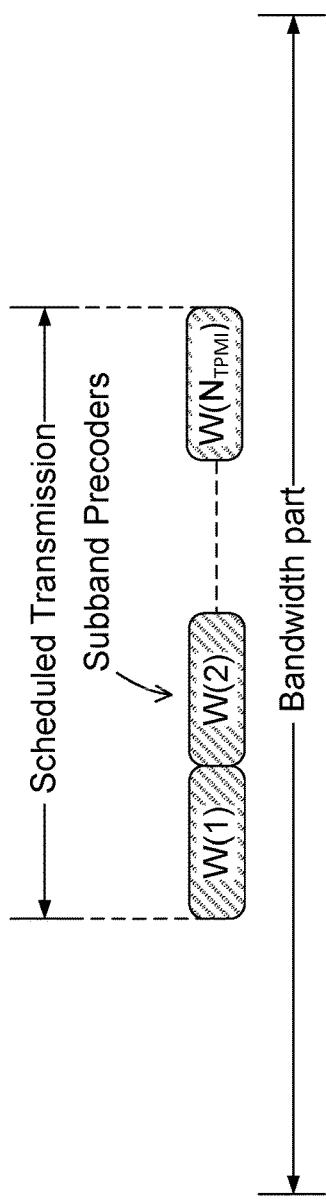
FIG. 22 is a block diagram illustrating example frequency selective precoding with sub-band precoders.

In an embodiment, if the number of configured TPMIs is greater or equal to a number of configured subbands for frequency selective precoding, i.e., $NTPMI \geq N_{Subband}$, one unique TPMI per subband may be assigned. FIG. 22 illustrates an example of such frequency selective precoding. In accordance with the example shown in FIG. 22, the number of configured subbands may match the number of TPMIs.

Figure 23:
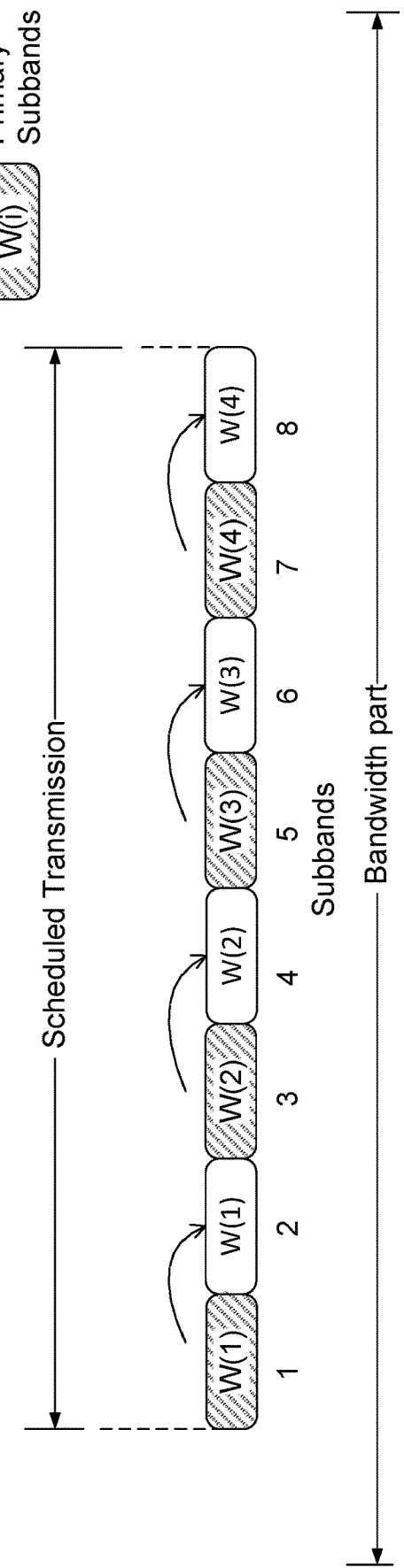
FIG. 23 is a block diagram illustrating example frequency selective precoding based on using transmit precoding matrix indices of primary subbands.

In an embodiment, if the number of configured TPMIs is less than the number of configured subbands for frequency selective precoding, i.e., $N_{TPMI} < N_{Subband}$, some TPMIs may be assigned to more than one subband. In an embodiment, the TPMIs may be indicted only for a specific set of subbands. The specific set of subbands may be referred to as primary subbands. A WTRU may use the received TPMIs intended for the primary subbands for precoding of one or more of its adjacent subbands, where the adjacent subbands may be on one or both side of a primary subbands. In an embodiment, the TPMI of a closest primary subband may be applied. FIG. 23 illustrates an exemplary case of where the indicated TPMIs of primary subband {1, 3, 5, 7} may also applied on their immediately next adjacent subbands {2, 4, 6, 8}.

Figure 24:
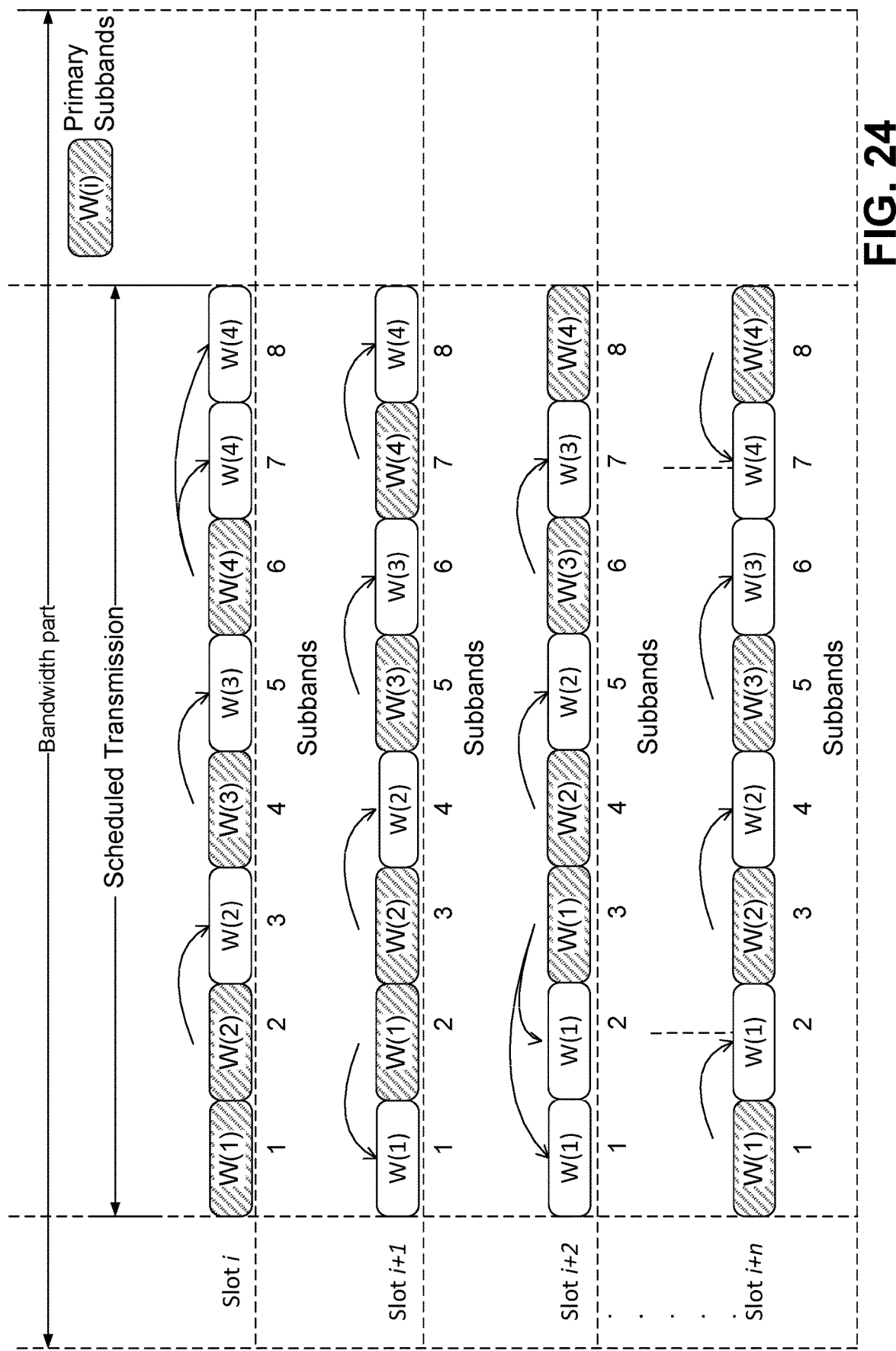
FIG. 24 is a block diagram illustrating example frequency selective precoding based on using transmit precoding matrix indices of primary subbands.

The designation of the primary subbands may be based on a uniform and structured pattern (e.g., as shown in FIG. 23) and/or based on a non-uniform pattern (e.g., as shown in FIG. 24).

A fair and balanced assignment of the primary subbands across the scheduled transmission may be supported. To do so, in an embodiment, the pattern of primary subbands may be cycled for each transmission event. FIG. 24 illustrates an exemplary case of non-uniform pattern with cycling. Alternatively and/or additionally, the pattern for designation of primary subbands may be randomly changed from one transmission event to another. Alternatively and/or additionally, the pattern of the primary subbands may be defined based on a time index, such as slot number, etc.

Although the representative examples regarding transmit precoding information provided herein are described in the context of the uplink, similar or complementary methods, procedures and technologies may be applied in the context of the downlink in view of the foregoing description.

Incorporation by Reference

Incorporated herein by reference are:

Qualcomm Incorporated, "Discussion on phase continuity and PRB bundling", 3GPP Tdoc R1-1612045, 3GPP TSG-RAN WG1 Meeting #87, Reno, USA, Nov. 14-18, 2016;

InterDigital Communications, "On Enhanced Frequency Selective Precoding for MIMO Transmission", 3GPP Tdoc R1-1700713, 3GPP TSG RAN WG1 AH_NR Meeting, Spokane, USA, Jan. 16-20, 2017; and PCT Patent Application No. PCT/US16/64551, filed Dec. 2, 2016.

Conclusion

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, the term "video" may mean any of a snapshot, single image and/or multiple images displayed over a time basis. As another example, when referred to herein, the terms "user equipment" and its abbreviation "UE" may mean (i) a wireless transmit and/or receive unit (WTRU), such as described supra; (ii) any of a number of embodiments of a WTRU, such as described supra; (iii) a wireless-capable and/or wired-capable (e.g., tetherable) device configured with, inter alfa, some or all structures and functionality of a WTRU, such as described supra; (iii) a wireless-capable and/or wired-capable device configured with less than all structures and functionality of a WTRU, such as described supra; or (iv) the like. Details of an example WTRU, which may be representative of any WTRU recited herein, are provided herein with respect to FIGS. 1A-1D.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit (CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analogue communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶ 6 or means-plus-function claim format, and any claim without the terms "means for" is not so intended.

What is claimed is:

1. A method implemented in a wireless transmit/receive unit (WTRU), the method comprising:
   receiving, from a base station, downlink control information (DCI) indicating a value of a single bit information element (IE) to use for determining a precoding resource block group (PRG) size of a physical downlink shared channel (PDSCH);
   based on the value of the single bit IE, determining which one of a plurality of configured PRG size sets to select a candidate PRG size from;
   based on the determined PRG size set, selecting the candidate PRG size,
      wherein the selected candidate PRG size comprises (i) a single configured PRG size, or (ii) one of a plurality of configured PRG sizes; and
   configuring or reconfiguring the WTRU in accordance with the selected candidate PRG size.

2. The method of claim 1, wherein selecting the candidate PRG size comprises:
   on condition that the determined PRG size set defines a single configured PRG size, selecting the single configured PRG size as the candidate PRG size.

3. The method of claim 1, wherein selecting the candidate PRG size comprises:
   on condition that the determined PRG size set defines a plurality of configured PRG sizes, selecting one of the plurality of configured PRG sizes as the candidate PRG size based on a configured rule.

4. The method of claim 3, wherein the configured rule specifies any of:
   which one of the plurality of configured PRG sizes to select based on bandwidth part size and scheduled bandwidth;
   which one of the plurality of configured PRG sizes to select based at least in part on a resource block group (RBG) size and a prior configured PRG size;
   which one of the plurality of configured PRG sizes to select based on any configured value; and
   which one of the plurality of configured PRG sizes to select based on a fixed relation to a configured value.

5. The method of claim 3, wherein the configured rule:
   (i) explicitly specifies which one of the plurality of configured PRG sizes to select;
   (ii) specifies one or more criteria for implicitly determining which one of the plurality of configured PRG sizes to select;
   (iii) specifies which one of the plurality of configured PRG sizes to select based at least in part on a particular number of contiguous scheduled resource blocks;
   (iv) specifies selecting a first PRG size options of the plurality of configured PRG sizes over a second PRG size options of the plurality of configured PRG sizes based at least in part on a preference of the first PRG size option over the second PRG size option;
   (viii) specifies selecting the first PRG size option on condition that a state change indicates changing from a current PRG size to the first PRG size option; or
   (ix) specifies selecting the second PRG size option on condition that a state change indicates changing from a current PRG size to the second PRG size option.

6. The method of claim 3, wherein the plurality of configured PRG sizes comprises first and second PRG size options, and wherein the configured rule specifies which one of the first and second PRG size options to select based at least in part on a resource block group (RBG) size.

7. The method of claim 6, wherein the RBG size is signaled or otherwise provided on any of a dynamic and semi-static basis, and on any of L1, L2 and higher layer control signaling or channels.

8. The method of claim 3, wherein the plurality of configured PRG sizes comprises first and second PRG size options, and wherein the configured rule specifies which one of the first and second PRG size options to select based at least in part on a resource block group (RBG) size and any of explicit and implicit assistance information.

9. The method of claim 4, wherein the configured value comprises any of a parameter of a system configuration and an arbitrary value, and wherein the configured value is based on, related to or a function of any of a size of an active bandwidth part and a location or range of a set of physical resource blocks (PRBs) within a bandwidth.

10. The method of claim 1, further comprising:
receive radio resource control (RRC) signaling including a single PRG size or a plurality of PRG sizes for each of the plurality of PRG size sets; and
configuring the plurality of PRG size sets in accordance with the RRC signaling.

11. A wireless transmit/receive unit (WTRU), comprising:
circuitry, including any of a processor, memory, receiver and transmitter, the circuitry configured to:
receive, from a base station, downlink control information (DCI) indicating a value of a single bit information element (IE) to use for determining a precoding resource block group (PRG) size of a physical downlink shared channel (PDSCH);
based on the value of the single bit IE, determine which one of a plurality of configured PRG size sets to select a candidate PRG size from;
based on the determined PRG size set, select the candidate PRG size,
wherein the selected candidate PRG size comprises (i) a single configured PRG size, or (ii) one of a plurality of configured PRG sizes; and
configure or reconfigure the WTRU in accordance with the selected candidate PRG size.

12. The WTRU of claim 11, wherein the circuitry is configured to:
on condition that the determined PRG size set defines a single configured PRG size, select the single configured PRG size as the candidate PRG size.

13. The WTRU of claim 11, wherein the circuitry is configured to:
on condition that the determined PRG size set defines a plurality of configured PRG sizes, select one of the plurality of configured PRG sizes as the candidate PRG size based on a configured rule.

14. The WTRU of claim 13, wherein the configured rule specifies any of:
which one of the plurality of configured PRG sizes to select based on bandwidth part size and scheduled bandwidth;
which one of the plurality of configured PRG sizes to select based at least in part on a resource block group (RBG) size and a prior configured PRG size;
which one of the plurality of configured PRG sizes to select based on any configured value; and
which one of the plurality of configured PRG sizes to select based on a fixed relation to a configured value.

15. The WTRU of claim 13, wherein the configured rule:
(i) explicitly specifies which one of the plurality of configured PRG sizes to select;
(ii) specifies one or more criteria for implicitly determining which one of the plurality of configured PRG sizes to select;
(iii) specifies which one of the plurality of configured PRG sizes to select based at least in part on a particular number of contiguous scheduled resource blocks;
(iv) specifies selecting a first PRG size options of the plurality of configured PRG sizes over a second PRG size options of the plurality of configured PRG sizes based at least in part on a preference of the first PRG size option over the second PRG size option;
(viii) specifies selecting the first PRG size option on condition that a state change indicates changing from a current PRG size to the first PRG size option; or
(ix) specifies selecting the second PRG size option on condition that a state change indicates changing from a current PRG size to the second PRG size option.

16. The WTRU of claim 13, wherein the plurality of configured PRG sizes comprises first and second PRG size options, and wherein the configured rule specifies which one of the first and second PRG size options to select based at least in part on a resource block group (RBG) size.

17. The WTRU of claim 16, wherein the RBG size is signaled or otherwise provided on any of a dynamic and semi-static basis, and on any of L1, L2 and higher layer control signaling or channels.

18. The WTRU of claim 13, wherein the plurality of configured PRG sizes comprises first and second PRG size options, and wherein the configured rule specifies which one of the first and second PRG size options to select based at least in part on a resource block group (RBG) size and any of explicit and implicit assistance information.

19. The WTRU of claim 14, wherein the configured value comprises any of a parameter of a system configuration and an arbitrary value, and wherein the configured value is based on, related to or a function of any of a size of an active bandwidth part and a location or range of a set of physical resource blocks (PRBs) within a bandwidth.

20. The method of claim 11, wherein the circuitry is configured to:
receive radio resource control (RRC) signaling including a single PRG size or a plurality of PRG sizes for each of the plurality of PRG size sets; and
configure the plurality of PRG size sets in accordance with the RRC signaling.

* * * * *